(12) United States Patent
Lee et al.

(10) Patent No.: US 12,716,776 B2
(45) Date of Patent: Aug. 25, 2026

(54) CALIBRATION DEVICE FOR DISPLAY AND PERSONAL COMPUTER HAVING SAME

(71) Applicant: LG ELECTRONICS INC., Seoul (KR)

(72) Inventors: Hyungchan Lee, Seoul (KR); Changsub Kim, Seoul (KR); Chulhong Kim, Seoul (KR); Sungyul An, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 132 days.

(21) Appl. No.: 18/721,852

(22) PCT Filed: Dec. 23, 2022

(86) PCT No.: PCT/KR2022/021143
§ 371 (c)(1),
(2) Date: Jun. 19, 2024

(87) PCT Pub. No.: WO2023/121375
PCT Pub. Date: Jun. 29, 2023

(65) Prior Publication Data

US 2025/0076120 A1 Mar. 6, 2025

(30) Foreign Application Priority Data

Dec. 24, 2021 (KR) ........................ 10-2021-0187623

(51) Int. Cl.
*G01J 3/50* (2006.01)
*G01J 3/52* (2006.01)

(52) U.S. Cl.
CPC ............... *G01J 3/506* (2013.01); *G01J 3/524* (2013.01)

(58) Field of Classification Search
CPC .. G09G 2360/14; G09G 3/006; G09G 3/2003; H04N 17/02; H04N 9/64;
(Continued)

(56) References Cited

U.S. PATENT DOCUMENTS

| | | | | |
|---|---|---|---|---|
| 7,505,025 | B2 | 3/2009 | Edelbrock | |
| 10,192,514 | B2 * | 1/2019 | Su | G06F 1/1607 |

(Continued)

FOREIGN PATENT DOCUMENTS

| | | |
|---|---|---|
| JP | 2005208548 | 8/2005 |
| JP | 2011022226 | 2/2011 |

(Continued)

OTHER PUBLICATIONS

PCT International Application No. PCT/KR2022/021143, International Search Report dated Apr. 17, 2023, 2 pages.

(Continued)

*Primary Examiner* — Muhammad N Edun
(74) *Attorney, Agent, or Firm* — LEE, HONG, DEGERMAN, KANG & WAIMEY

(57) ABSTRACT

The present invention relates to a calibration device for a display and a personal computer having the same. The calibration device for a display of the present invention includes: a housing having a mounting groove allowing the housing to be installed to an edge of a display and detachably installed to the edge of the display; a screen detection unit provided at the housing to be movable between a protrusion position at which the screen detection unit protrudes to the front of the screen of the display and a withdrawal position at which the screen detection unit is withdrawn to the outside of the screen of the display; and a screen detection unit-driving part for driving the screen detection unit to be placed at the protrusion position or the (Continued)

withdrawal position. By this, the calibration device can be detachably coupled to the display.

19 Claims, 21 Drawing Sheets

(58) Field of Classification Search
CPC .......... G01J 3/506; G01J 3/0291; G01J 3/524; G01J 3/0202
See application file for complete search history.

(56) References Cited

U.S. PATENT DOCUMENTS

| | | | | |
|---|---|---|---|---|
| 11,976,977 | B2* | 5/2024 | Sim | G01J 3/506 |
| 2013/0006532 | A1 | 1/2013 | Sudo | |
| 2014/0091210 | A1* | 4/2014 | Hogo | G01J 1/0403 250/216 |
| 2018/0120163 | A1 | 5/2018 | Su et al. | |
| 2020/0196458 | A1 | 6/2020 | Wu et al. | |
| 2020/0240582 | A1* | 7/2020 | Lin | H02K 7/116 |

FOREIGN PATENT DOCUMENTS

| | | |
|---|---|---|
| JP | 2012150213 | 8/2012 |
| JP | 2014132304 | 7/2014 |
| KR | 100775889 | 11/2007 |
| KR | 1020090037785 | 4/2009 |
| KR | 101266011 | 5/2013 |
| KR | 102182822 | 11/2020 |

OTHER PUBLICATIONS

European Patent Office Application Serial No. 22912008.4, Search Report dated Mar. 11, 2025, 9 pages.

* cited by examiner

CALIBRATION DEVICE FOR DISPLAY AND PERSONAL COMPUTER HAVING SAME

CROSS-REFERENCE TO RELATED APPLICATION(S)

This application is the National Stage filing under 35 U.S.C. 371 of International Application No. PCT/KR2022/021143, filed on Dec. 23, 2022, which claims the benefit of earlier filing date and right of priority to Korean Application No. 10-2021-0187623, filed on Dec. 24, 2021, the contents of which are all incorporated by reference herein in their entirety.

TECHNICAL FIELD

The present disclosure relates to a calibration device for a display and a personal computer having the same.

BACKGROUND ART

As is well known, a personal computer (PC) includes a personal computer body with an operating system, an output device connected to the personal computer body to output information, and an input device for inputting a manipulation signal.

The input device is implemented as a keyboard for inputting characters.

The output device is implemented as a display that outputs visual information.

A calibration device refers to a device that detects an image output to the display of the personal computer and performs color correction and/or image correction of the image output to the display.

Some of those calibration devices are configured to be fixed by a user to a screen of the display while the calibration device is connected to the personal computer body through a cable, such that the image correction can be performed.

However, in this related art calibration device, such image correction is performed after installing the calibration device on the screen of the display. This imposes a burden on color correction and/or image correction.

In consideration of this problem, in some cases, there is known a calibration device that is disposed inside a bezel of the display. The calibration device protrudes from the bezel of the display when performing image correction, and then retracted into the bezel of the display after completion of the color correction and/or image correction.

However, in the related art calibration device disposed in the bezel of the display, a receiving space for the calibration device must be defined inside the bezel of the display, which causes an increase in width and/or thickness of the bezel of the display.

Additionally, this related art calibration device is integrally coupled to the display, so there is a problem in that it is difficult to use the calibration device with other displays.

In addition, the related art calibration device is embedded in the display, which causes an increase in costs to purchase the display.

Furthermore, when the display is replaced, the calibration device is also replaced regardless of whether the calibration device is broken. This causes a problem of lowering use efficiency of the calibration device.

Additionally, since the calibration device is built in the display, there is a problem in that it is not easy to inspect and/or replace the calibration device.

PRIOR ART DOCUMENTS

Patent Documents

1. Korean Patent Registration No. 10-0775889 (registered on Nov. 13, 2007)
2. US Patent Registration No. U.S. Pat. No. 7,505,025 B2 (registered on Mar. 17, 2009)

DISCLOSURE OF INVENTION

Technical Problem

Therefore, an aspect of the present disclosure is to provide a calibration device for a display that is capable of being detachably coupled to the display and, a personal computer having the same.

Another aspect of the present disclosure is to provide a calibration device for a display that is capable of easily performing a calibration (correction) work, and a personal computer having the same.

Still another aspect of the present disclosure is to provide a calibration device for a display that is capable of being easily inspected and replaced, and a personal computer having the same.

Solution to Problem

In order to solve the problems described above, a calibration device for a display according to the present disclosure has a technical feature in that the calibration device is detachably coupled to the display.

Specifically, a mounting groove into which an edge of the display is inserted may be formed in a housing of the calibration device, such that the calibration device is detachably coupled to the display.

Specifically, the housing of the calibration device may include a screen sensing unit that is movable between a protruding position at which the screen sensing unit protrudes to the front of a screen of the display and a retracted position at which the screen sensing unit is retracted to outside of the screen of the display, which can facilitate color correction and/or image correction of the display.

In addition, when color correction and/or image correction are not performed, the screen sensing unit can be retracted to the outside of the screen of the display. This can suppress the screen sensing unit from visually blocking (interfering with) the screen of the display, thereby increasing visibility of the screen of the display.

In one embodiment, the calibration device for the display may include: a housing that has a mounting groove by which the housing is mounted on an edge of the display and that is detachably mounted on the edge of the display; a screen sensing unit that is disposed in the housing to be movable between a protruding position protruding to the front of a screen of the display and a retracted position retracted to outside of the screen of the display; and a screen sensing unit driving unit that actuates the screen sensing unit so that the screen sensing unit is located at the protruding position or the retracted position.

Therefore, the calibration device for the display that can be detachably coupled to the display can be provided.

Additionally, the calibration device for the display that can be easily inspected and replaced can be provided.

Additionally, when the display calibration device is not used, screen blocking caused by the screen sensing unit can be suppressed.

In one embodiment, the screen sensing unit may include a sensor that senses the screen of the display, and a sensor holder that receives the sensor therein, and has one end portion rotatably coupled to the housing.

Here, the sensor may be disposed on another end portion of the sensor holder.

The sensor may be implemented as an image sensor.

Accordingly, when the screen sensing unit is located at the protruding position, the sensor can easily sense (photograph) the screen of the display.

In one embodiment, the calibration device may further include a printed circuit board that is disposed inside the housing, and electrically connected to the sensor and the screen sensing unit actuating part.

Here, the printed circuit board may include a controller that has a control program to be implemented in the form of a microprocessor.

The controller may be electrically connected to the sensor and the screen sensing unit actuation part.

Accordingly, the controller can control the screen sensing unit actuation part such that the screen sensing unit protrudes to the protruding position. This can allow color correction and/or image correction of the screen of the display based on an image signal of the screen of the display sensed by the sensor.

In one embodiment of the present disclosure, the housing may include a lower housing having a mounting groove, and an upper housing coupled to a top of the lower housing to define an inner receiving space together with the lower housing.

Here, the inner receiving space of the housing may include a front space defined at the front of the mounting groove, a rear space defined at the rear of the mounting groove, and an upper space defined above the mounting groove.

This can result in efficiently receiving components.

Specifically, the printed circuit board may be disposed in the upper space.

The front space may have a screen sensing unit receiving portion in which the screen sensing unit is received.

A connection cable, which will be described later, may be received in the rear space.

In one embodiment of the present disclosure, the screen sensing unit actuating part may include a lead screw that is disposed in a longitudinal direction of the edge of the display, a slider that is coupled to the lead screw to be relatively movable, and a power transmission part that transmits moving force of the slider to the screen sensing unit.

As a result, the screen sensing unit actuating part may be disposed along a longitudinal direction of the housing, thereby reducing the size of the housing in an axial direction.

In one embodiment of the present disclosure, the power transmission part may include a first gear portion that is disposed in a mutual contact region between the slider and the screen sensing unit, and a second gear portion engaged with the first gear portion.

In one embodiment of the present disclosure, the first gear portion may be formed in a linear shape and the second gear portion may be formed in a circular or arcuate shape.

Here, the first gear portion may be disposed on the slider and the second gear portion may be disposed on the screen sensing unit.

Accordingly, rotational force of the lead screw can be converted into a linear motion of the slider and then converted into a rotational motion of the screen sensing unit.

In one embodiment of the present disclosure, the lead screw may include a lead screw body that is formed in a rod shape, and a spiral that is formed in a spiral shape on an outer surface of the lead screw body, and the slider may be provided with a spiral coupling member that is coupled to the spiral.

Accordingly, a rotational motion of the lead screw can be converted into a linear motion of the spiral coupling member.

Here, the spiral may be formed as a spiral groove recessed into the outer surface of the lead screw body, and the spiral coupling member may include a body that is formed in a shape of a plate, and a protrusion that protrudes from the body to be inserted into the spiral groove.

This can simplify the structure of the spiral coupling member, resulting in facilitating manufacturing of the spiral coupling member.

The protrusion may be provided in plurality spaced apart from one another in a longitudinal direction of the lead screen body.

This can distribute rotational force of the lead screw body to be smoothly transmitted to the spiral coupling member.

In one embodiment of the present disclosure, the spiral coupling member may further include an elastic pressing member that is detachable from the slider, and disposed to elastically press the spiral coupling member, such that the spiral coupling member is brought into close contact with the lead screw.

Accordingly, the spiral coupling member can be elastically coupled in close contact with the spiral of the lead screw.

This can stably maintain the coupled state between the spiral coupling member and the lead screw.

In one embodiment of the present disclosure, the calibration device may further include a fastening member that is fastened to the slider through the spiral coupling member and the elastic pressing member.

This can reduce the number of fastening members (screws) to be used.

In one embodiment of the present disclosure, the printed circuit board may be provided with an overlap portion that overlaps the slider along an axial direction.

This can shorten an axial length of the calibration device for the display.

In one implementation of the present disclosure, the overlap portion may include a position sensing part that senses a position of the screen sensing unit.

The position sensing part may be connected to a controller of the printed circuit board.

Accordingly, the controller of the printed circuit board can control the sensor and the screen sensing unit actuation part based on a sensing signal from the position sensing part.

In one embodiment of the present disclosure, the calibration device may further include a guide disposed in parallel with the lead screw, and the slider may include a guide receiving portion in which the guide is received to be relatively movable.

This can allow a smooth linear motion of the slider.

In one embodiment of the present disclosure, the housing may include a guide pin inserted into the edge of the display.

This can allow the calibration device for the display to be accurately coupled to a preset position on the edge of the display.

In one embodiment of the present disclosure, a frame made of a magnetic material may be disposed inside the housing, and the guide pin may protrude downward from a bottom of the frame and protrude downward into the mounting groove.

Here, a guide pin receiving portion into which the guide pin is inserted may be disposed in the edge of the display.

A magnetic member generating magnetic force may be disposed on the edge of the display such that the display can be coupled to the frame by the magnetic force.

The magnetic member may be implemented as a permanent magnet.

In one embodiment of the present disclosure, the calibration device may further include a supporter that is disposed between the frame and the printed circuit board to support the printed circuit board below the printed circuit board.

Accordingly, the printed circuit board can be stably supported with being spaced apart from the upper side of the frame.

This can suppress tilting of the printed circuit board.

Here, the frame may include a support piece for supporting the supporter.

In one embodiment of the present disclosure, the calibration device may further include a connection cable that has one end portion communicatively connected to the printed circuit board and another end portion drawn out of the housing to be connected to the display or a personal computer body connected to the display.

Accordingly, the controller of the printed circuit board can smoothly transmit a correction signal based on an image signal sensed by the sensor to the display or the personal computer body.

Meanwhile, according to another aspect of the present disclosure, there is provided a personal computer including: a display; a personal computer body that is connected to the display; and a calibration device for a display that is detachably mounted on an edge of the display to sense and calibrate a screen of the display, wherein the calibration device for the display includes: a housing that has a mounting groove by which the housing is mounted on an edge of the display, the housing being detachably mounted on the edge of the display; a screen sensing unit that is disposed in the housing to be movable between a protruding position protruding to the front of a screen of the display and a retracted position retracted to outside of the screen of the display; and a screen sensing unit actuating part that actuates the screen sensing unit so that the screen sensing unit is located at the protruding position or the retracted position, and the calibration device for the display is communicatively connected to the display or the personal computer body.

This can facilitate the correction of the display.

Additionally, the calibration device for the display can be separated from the display, making it easy to inspect and/or replace the calibration device.

Advantageous Effects of Invention

As described above, according to an embodiment of the present disclosure, a calibration device for a display may include a housing having a mounting groove to be mounted to an edge of the display. This can allow the calibration device for the display to be detachably coupled to the display.

In addition, a screen sensing unit may be disposed in the housing to be movable between a protruding position at which the screen sensing unit protrudes to the front of a screen of the display and a retracted position at which the screen sensing unit is retracted to outside of the screen of the display, thereby suppressing the screen of the display from being blocked due to the screen sensing unit.

A screen sensing unit actuating part may be disposed to actuate the screen sensing unit to be disposed at the protruding position or the retracted position, thereby facilitating the protrusion and retraction of the screen sensing unit.

The screen sensing unit may include a sensor and a sensor holder that receives the sensor therein and has one end portion rotatably coupled to the housing, which can facilitate the protrusion and retraction of the sensor for sensing the screen.

A printed circuit board may be disposed inside the housing to be electrically connected to the sensor and the screen sensing unit actuating part, thereby facilitating the sensor to sense the screen.

An inner receiving space of the housing may have a front space, a rear space, and an upper space based on the mounting groove, thereby efficiently accommodating components.

The screen sensing unit actuating part may include a lead screw, a slider, and a power transmission part disposed in the longitudinal direction of the edge of the display, thereby suppressing an increase in size of the calibration device for the display in a widthwise direction.

In addition, the power transmission part may include a first gear portion and a second gear portion that are formed to be engaged with each other in a mutual contact region between the slider and the screen sensing unit, so that rotational force of the lead screw can be transmitted to the screen sensing unit.

Additionally, the first gear portion may be formed in a linear shape and the second gear portion may be formed in a circular or arcuate shape, so that the rotational force of the lead screw can be transmitted to the screen sensing unit through linear motion and rotational motion.

In addition, the spiral may be formed as a spiral groove, and a spiral coupling member may include a body and a protrusion, which can simplify the structure of the spiral coupling member and facilitate manufacturing of the spiral coupling member.

In addition, an elastic pressing member may be disposed to elastically press the spiral coupling member, thereby stably maintaining the coupled state between the spiral coupling member and the lead screw.

A fastening member may be fastened to the slider through the spiral coupling member and the elastic pressing member, which may result in reducing the number of places where the fastening members are fastened.

The printed circuit board may have an overlap portion that overlaps the slider in an axial direction, which can suppress an increase in axial length of the calibration device for the display.

A position sensing part for sensing the position of the screen sensing unit may be disposed on the overlap portion, so as to appropriately control the screen sensing unit actuating part based on a sensing result of the position sensing part.

A guide may be disposed in parallel with the lead screw and a guide receiving portion in which the guide is accommodated may be disposed in the slider, thereby enabling a smooth linear motion of the slider.

The housing may include a guide pin inserted into the edge of the display, so that the calibration device for the display can be coupled to the display at an accurate preset position.

A supporter may be disposed between the frame and the printed circuit board to support the printed circuit board below the printed circuit board, thereby suppressing tilting of the printed circuit board.

A connection cable may be disposed such that one end portion thereof is connected to the printed circuit board and another end portion is connected to the display or personal computer body, which can allow smooth connection (signal transmission) between the calibration device for the display and the display or a personal computer body.

MODE FOR THE INVENTION

Hereinafter, implementations disclosed in this specification will be described in detail with reference to the accompanying drawings. In this specification, the same or equivalent components may be provided with the same or similar reference numbers even in different implementations, and description thereof will not be repeated. A singular representation used herein may include a plural representation unless it represents a definitely different meaning from the context. In describing the present disclosure, if a detailed explanation for a related known technology or construction is considered to unnecessarily divert the gist of the present disclosure, such explanation has been omitted but would be understood by those skilled in the art. It should be noted that the attached drawings are provided to facilitate understanding of the implementations disclosed in this specification, and should not be construed as limiting the technical idea disclosed in this specification by the attached drawings.

Figure 1:
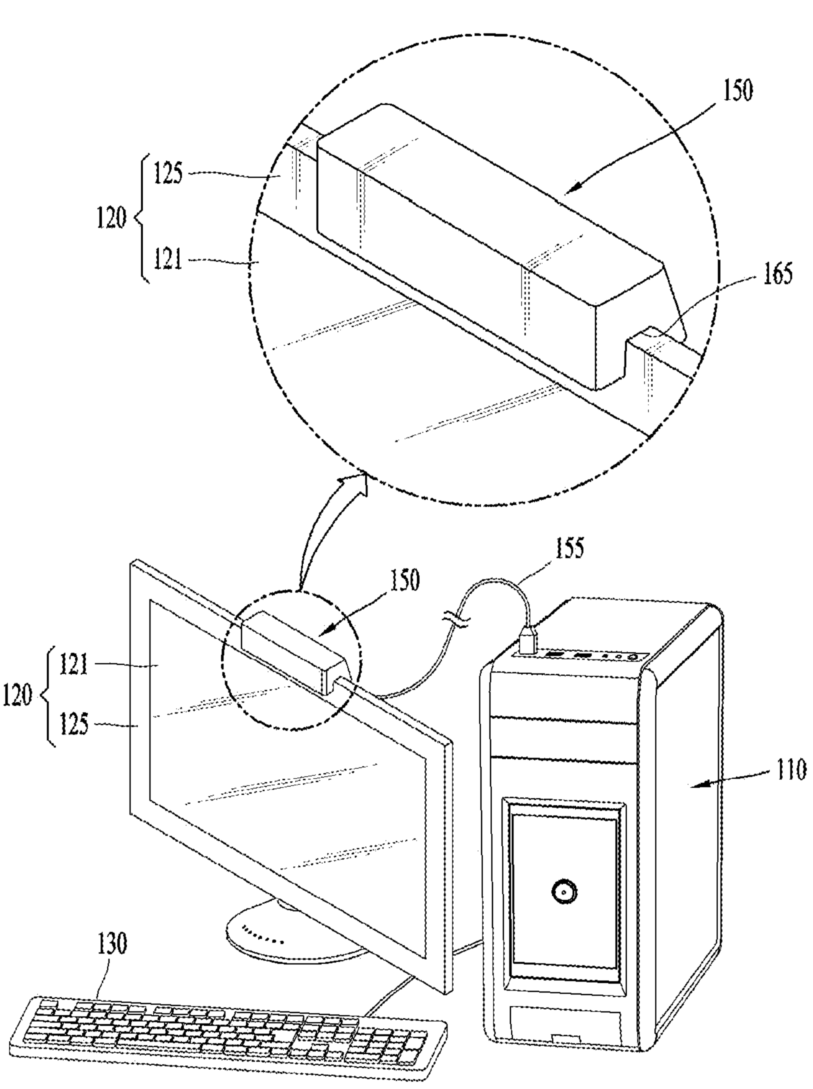
FIG. 1 is a perspective view of a personal computer having a calibration device for a display according to an embodiment of the present disclosure.
Figure 2:
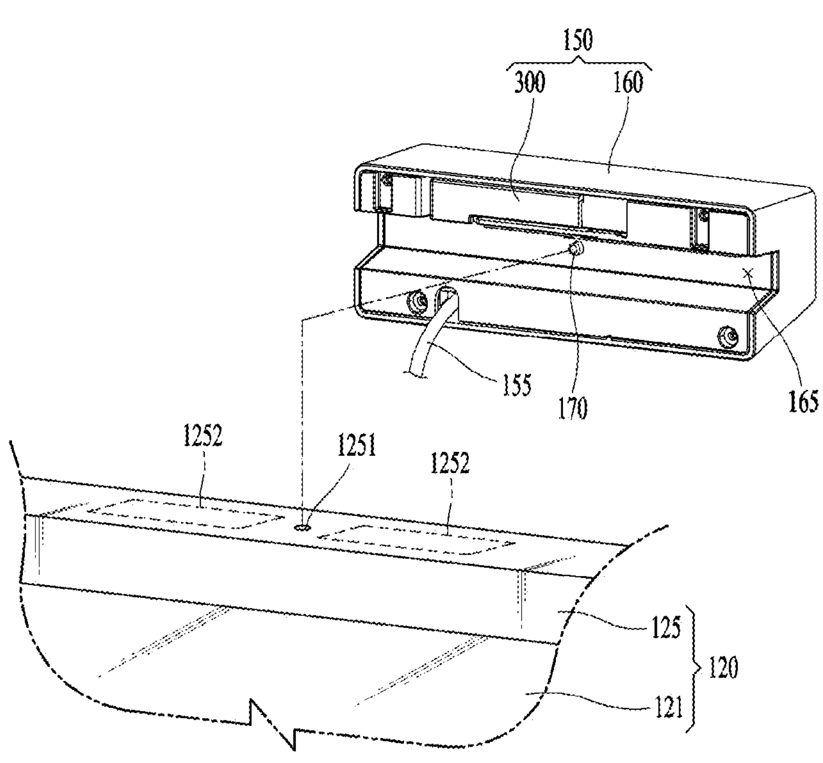
FIG. 2 is a diagram illustrating the bottom of the calibration device for the display of FIG. 1 and the top region of the display.
Figure 3:
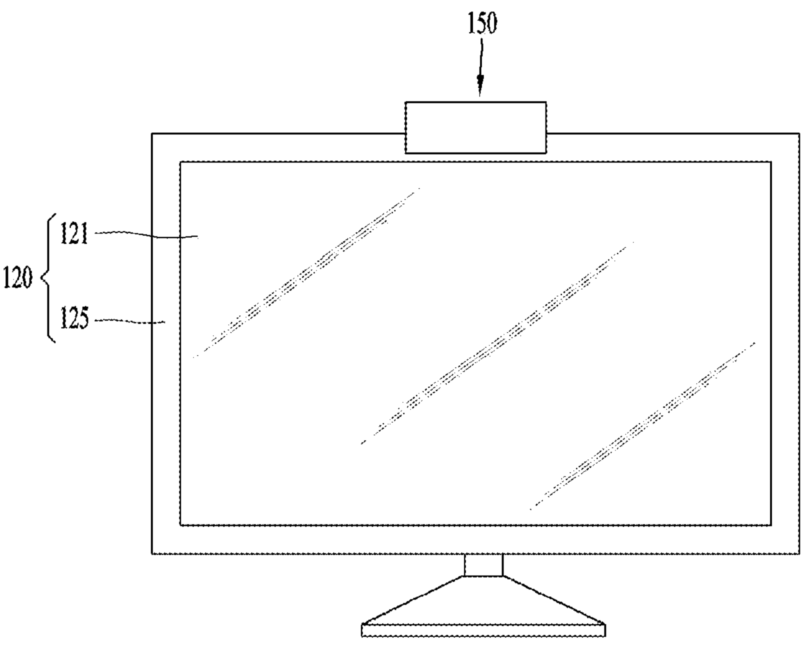
FIG. 3 is a front view illustrating a coupled state between the calibration device for the display of FIG. 1 and the display.
Figure 4:
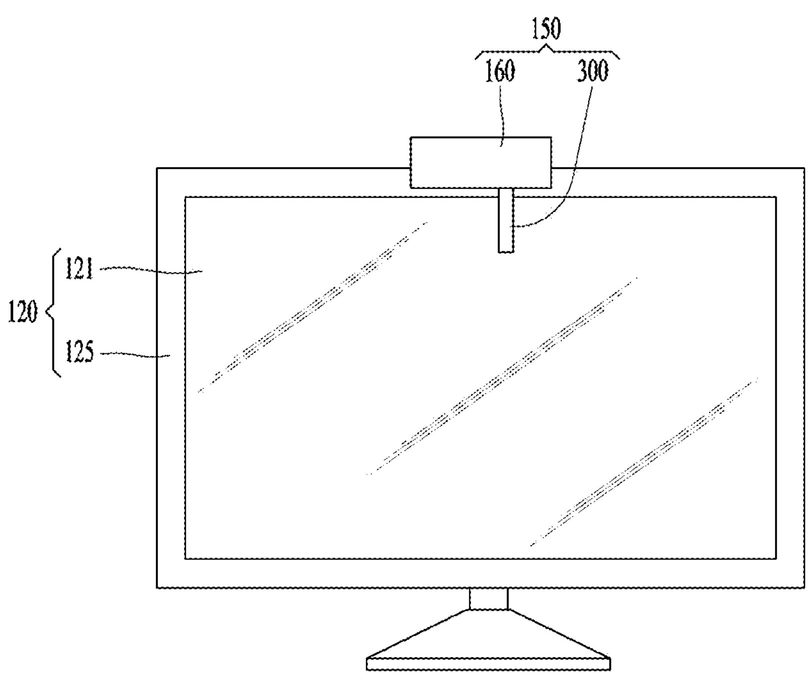
FIG. 4 is a diagram illustrating a protruding position of a screen sensing unit of the calibration device for the display of FIG. 3.

FIG. 1 is a perspective view of a personal computer having a calibration device for a display according to an embodiment of the present disclosure, FIG. 2 is a diagram illustrating the bottom of the calibration device for the display of FIG. 1 and the top region of the display, FIG. 3 is a front view illustrating a coupled state between the calibration device for the display of FIG. 1 and the display, and FIG. 4 is a diagram illustrating a protruding position of a screen sensing unit of the calibration device for the display of FIG. 3.

As illustrated in FIG. 1, the personal computer includes a personal computer body 110 equipped with an operating system (OS), a display 120 connected to the personal computer body 110 to display image information on a screen, and a calibration device 150 for a display (a display calibration device 150) detachably coupled to an edge 125 of the display 120. The personal computer includes, for example, a keyboard 130 connected to the personal computer body 110 to input characters.

The display 120 includes a screen 121 that displays image information, and an edge 125 or bezel (hereinafter, referred to as "edge 125") surrounding the outside of the screen 121.

The display 120 is connected to the personal computer body 110 by a cable (not illustrated) to enable signal transmission.

The embodiment of the present disclosure illustrates the case where the personal computer body 110 and the display 120 are separated from each other, but is merely illustrative, and is not limited thereto. The personal computer body 110 and the display 120 may alternatively be implemented as an integral body.

The display calibration device 150 is communicatively connected to the display 120 or the personal computer body 110.

The embodiment of the present disclosure illustrates the case where the display calibration device 150 is provided with a connection cable 155 and the connection cable 155 is connected to the personal computer body 110, but is merely illustrative, and is not limited thereto.

The display calibration device 150 (the connection cable 155) may alternatively be configured to be directly connected to the display 120.

The display calibration device 150 has a mounting groove 165 to be mounted to the edge 125 of the display 120.

Accordingly, the display calibration device 150 can be detachably coupled to the display 120.

According to this configuration, the display calibration device 150 can be easily detached (separated) from the display 120 as necessary, which can facilitate inspection and/or replacement of the display calibration device 150.

The mounting groove 165 is formed in the bottom of the display calibration device 150 to be recessed upward.

The display calibration device 150 includes a guide pin 170 coupled to the display 120.

Accordingly, the display calibration device 150 can be accurately coupled to the display 120 at a preset coupling position.

According to this configuration, a screen sensing unit 300 can be accurately disposed at a preset position in front of the screen 121 of the display 120, which can improve sensing accuracy of the screen sensing unit 300.

The guide pin 170 protrudes downward from a recessed bottom (ceiling 1653) of the mounting groove 165.

As illustrated in FIG. 2, the display 120 may be provided with a guide pin receiving portion 1251 in which the guide pin 170 can be inserted.

The guide pin receiving portion 1251 may be formed, for example, in an upper end portion of the edge 125 of the display 120 to be recessed downward.

The display calibration device 150 and the display 120 may be configured to be attracted to each other by magnetic force.

With the configuration, when the display calibration device 150 and the display 120 are coupled to each other, clearance (gap) of the display calibration device 150 with respect to the display 120 can be suppressed.

The display 120 may be provided with permanent magnets 1252 for generating magnetic force, for example. The embodiment of the present disclosure illustrates the case where the permanent magnets 1252 are disposed on the display 120, but is merely illustrative, and is not limited thereto.

The display calibration device 150 may be provided with a magnetic body (for example, a frame 260 to be described later) that can be attracted by the magnetic force of the permanent magnets 1252.

The permanent magnets 1252 may be disposed, for example, on both sides of the guide pin receiving portion 1251, respectively.

The embodiment of the present disclosure illustrates the case where the display calibration device 150 is provided with the magnetic body and the display 120 is provided with the permanent magnets 1252, but is merely illustrative. Alternatively, the permanent magnets may be disposed on the display calibration device 150 and the magnetic body may be disposed on the display 120.

The display calibration device 150 includes a housing 160, a screen sensing unit 300, and a screen sensing unit actuating part 350.

The housing 160 is provided with the mounting groove 165 by which the housing 160 can be detachably coupled to the display 120.

The screen sensing unit 300 is disposed on the housing 160.

The screen sensing unit 300 is configured to be movable between a protruding position (or protrusion position) at which it protrudes to the front of the screen 121 of the display 120 (see FIG. 4) and a retracted position (or withdrawal position) at which it is retracted to the outside of the screen 121 of the display 120 (see FIG. 3).

Figure 5:
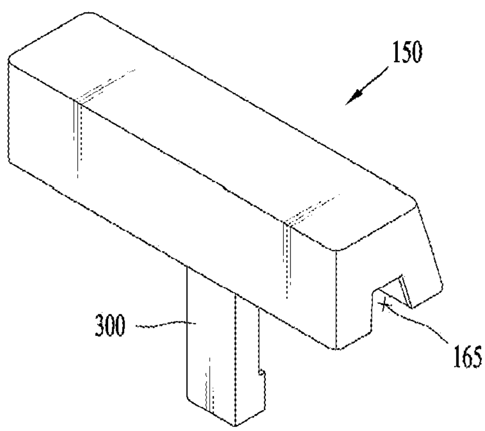
FIG. 5 is an enlarged perspective view of the calibration device for the display of FIG. 4.
Figure 6:
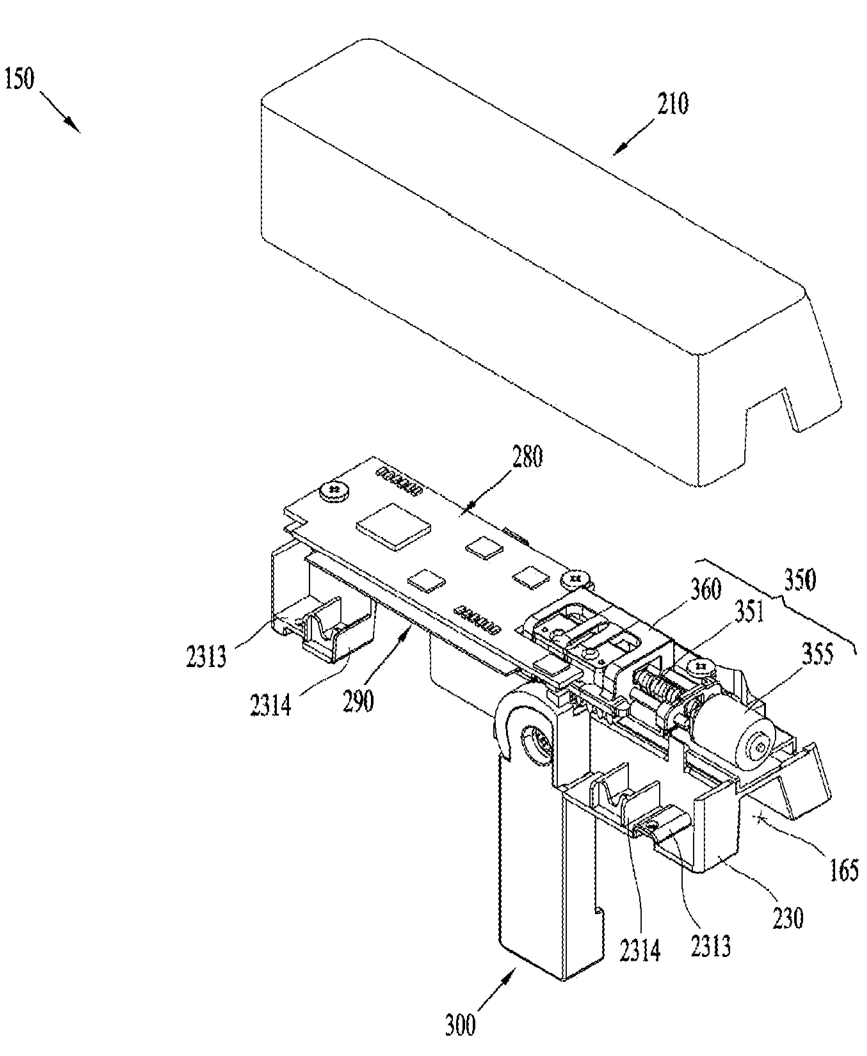
FIG. 6 is an exploded perspective view illustrating an upper housing of the calibration device for the display of FIG. 5.
Figure 7:
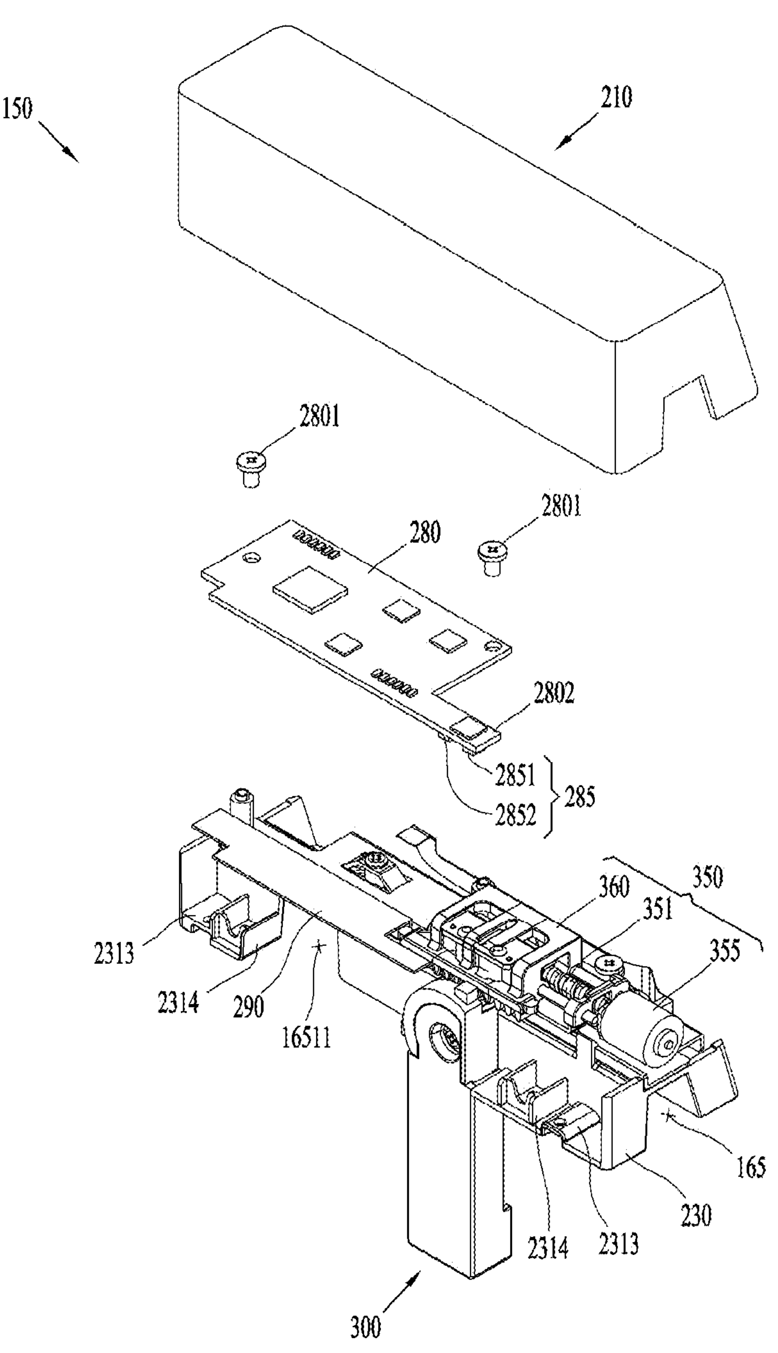
FIG. 7 is a perspective view in a state where a printed circuit board of FIG. 6 is separated.
Figure 8:
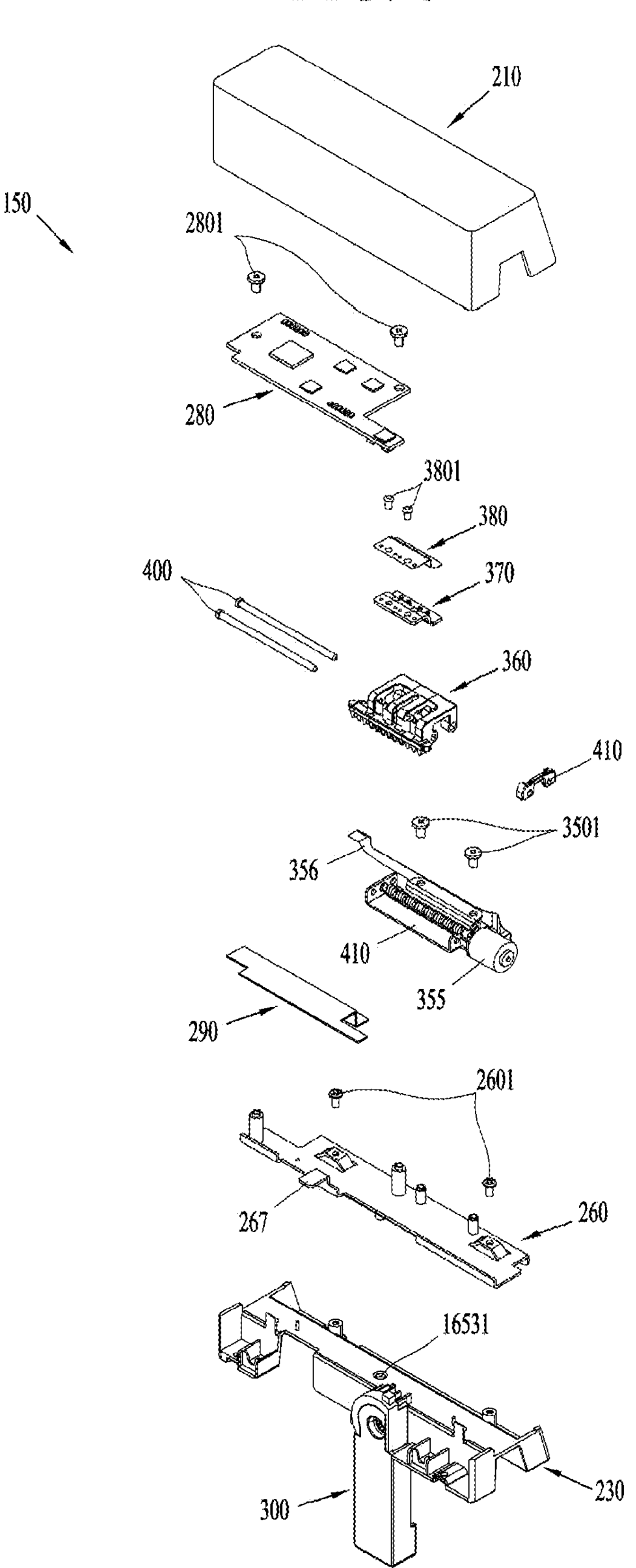
FIG. 8 is a perspective view illustrating a state where a slider, supporter, and frame of FIG. 7 are additionally separated.

FIG. 5 is an enlarged perspective view of the calibration device for the display of FIG. 4, FIG. 6 is an exploded perspective view illustrating an upper housing of the calibration device for the display of FIG. 5, FIG. 7 is a perspective view in a state where a printed circuit board of FIG. 6 is separated, and FIG. 8 is a perspective view illustrating a state where a slider, supporter, and frame of FIG. 7 are additionally separated. As illustrated in FIGS. 5 and 6, the display calibration device 150 includes the housing 160, the screen sensing unit 300, and the screen sensing unit actuating part 350.

The mounting groove 165 is formed in the bottom of the housing 160 such that the housing 160 can be mounted to the edge 125 of the display 120.

The housing 160 includes, for example, a lower housing 230 and an upper housing 210 that are coupled along a vertical (up and down) direction.

A receiving space S is defined inside the lower housing 230 and the upper housing 210.

The receiving space S inside the housing 160 defines based on the mounting groove 165, for example, a front space S1 located at the front of the mounting groove 165, a rear space S2 located at the rear of the mounting groove 165, and an upper space S3 located at the top of the mounting groove 165.

The screen sensing unit 300 is disposed in the housing 160 to be movable between a protruding position protruding to the front of the screen 121 of the display 120 and a retracted position retracted to the outside of the screen 121 of the display 120.

The housing 160 includes therein a screen sensing unit actuating part 350 that actuates the screen sensing unit 300 so that the screen sensing unit 300 is disposed at either the protruding position or the retracted position.

The housing 160 includes therein a printed circuit board 280 that is electrically connected to a sensor 310 of the screen sensing unit 300 and the screen sensing unit actuating part 350, which will be described later.

The printed circuit board 280 is, for example, disposed in the upper space S3.

The printed circuit board 280 is detachably coupled to the lower housing 230 by a plurality of fastening members (screws) 2801.

A supporter 290 for supporting the printed circuit board 280 may be disposed below the printed circuit board 280.

A frame 261 is disposed below the supporter 290.

The frame 261 is made of a magnetic material.

The frame 261 is disposed in contact with the inside of the ceiling 1653 of the mounting groove 165 of the lower housing 230.

The frame 261 is detachably coupled to the lower housing 230 by a plurality of fastening members 2601.

The screen sensing unit actuating part 350 includes a lead screw 351, a slider 360, and a lead screw driving motor 355.

The screen sensing unit actuating part 350 includes a bracket 410 that rotatably supports the lead screw 351.

The screen sensing unit actuating part 350 includes guides 400 disposed in parallel to the lead screw 351.

The guides 400 may be formed of a rod shape, for example.

The embodiment of the present disclosure illustrates the case where the guides 400 are implemented in the rod shape, but is merely illustrative, and is not limited thereto.

The guides 400 may be disposed, for example, on both sides of the lead screw 351, respectively.

Figure 23:
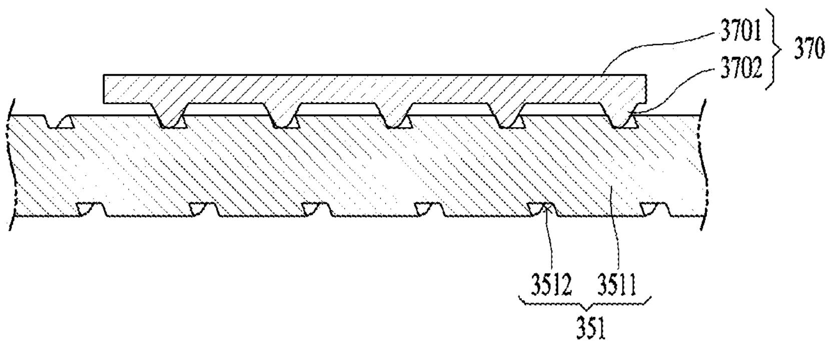
FIG. 23 is a lateral sectional view illustrating a coupled state between a lead screw and a spiral coupling member of FIG. 21.

The slider 360 is provided with a spiral coupling member 370 coupled to a spiral 3512 of the lead screw 351 (see FIG. 23).

The slider 360 includes an elastic pressing member 380 for elastically pressing the spiral coupling member 370 such that the spiral coupling member 370 is brought into close contact with the spiral 3512 of the lead screw 351.

This can stably maintain the coupled state between the spiral coupling member 370 and the lead screw 351.

Figure 9:
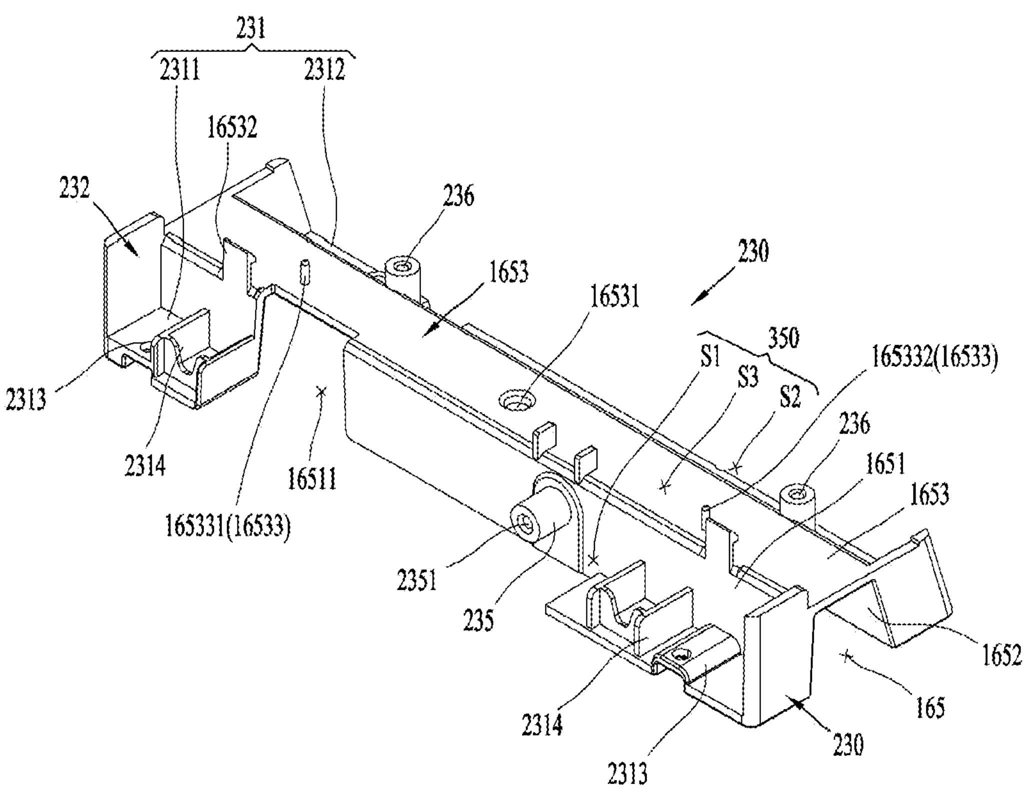
FIG. 9 is an enlarged perspective view of a lower housing of FIG. 6.
Figure 10:
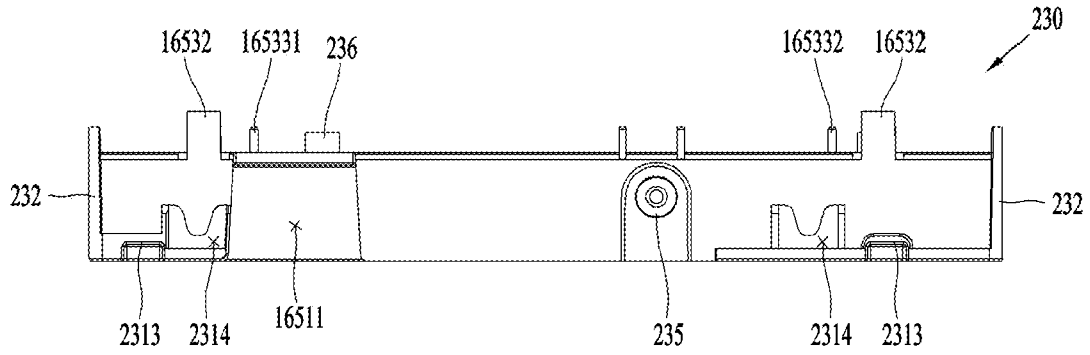
FIG. 10 is a front view of the lower housing of FIG. 9.
Figure 11:
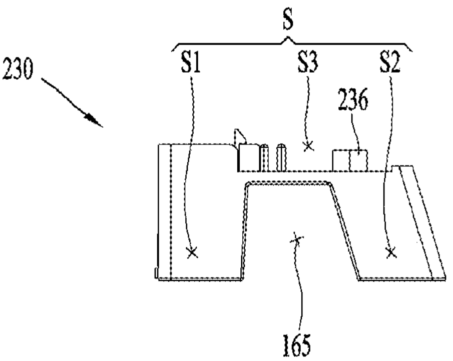
FIG. 11 is a right-sided view of the lower housing of FIG. 9.
Figure 12:
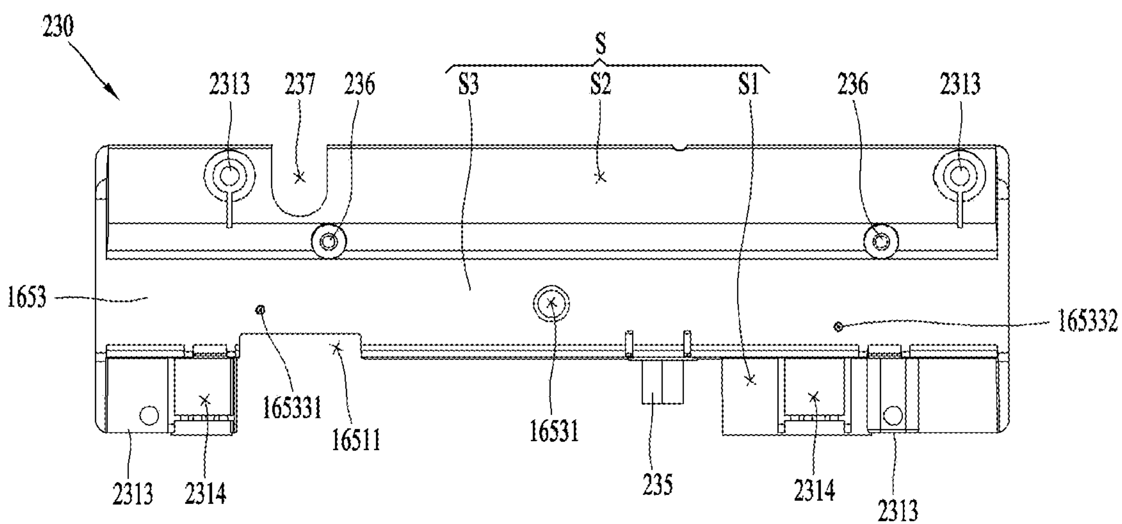
FIG. 12 is a planar view of the lower housing of FIG. 9.

FIG. 9 is an enlarged perspective view of the lower housing of FIG. 6, FIG. 10 is a front view of the lower housing of FIG. 9, FIG. 11 is a right-sided view of the lower housing of FIG. 9, and FIG. 12 is a planar view of the lower housing of FIG. 9. As illustrated in FIGS. 9 to 12, the lower housing 230 includes a bottom surface part 231 and a mounting groove 165.

The bottom surface part 231 includes a front bottom portion 2311 disposed on the front of the mounting groove 165 and a rear bottom portion 2312 disposed on the rear of the mounting groove 165.

The mounting groove 165 is defined, for example, by a front wall 1651, a rear wall 1652, and a ceiling 1653 connecting upper ends of the front wall 1651 and the rear wall 1652.

For example, the lower housing 230 includes a first end wall 232 disposed on one end portion thereof (a left end portion in the drawing) and a second end wall (a right end portion in the drawing) disposed on another end portion along a longitudinal direction.

Both the first end wall 232 and the second end wall 233 are inserted into the upper housing 210.

For example, the first end wall 232 connects a first end portion (a left end portion in the drawing) of the front bottom portion 2311 and a first end portion of the front wall 1651 and also connects a first end portion of the rear bottom portion 2312 and a first end portion of the rear wall 1652.

For example, the second end wall 233 connects a second end portion (a right end portion in the drawing) of the front bottom portion 2311 and a second end portion of the front wall 1651 and also connects a second end portion of the rear bottom portion 2312 and a second end portion of the rear wall 1652.

The bottom surface part 231 of the lower housing 230 is provided with fastening member coupling portions 2313 so that the lower housing 230 is coupled to the upper housing 210 by fastening members.

The fastening member coupling portions 2313 of the lower housing 230 may be disposed at a total of four locations, namely, both ends of the front bottom portion 2311 and both ends of the rear bottom portion 2312.

For example, each fastening member coupling portion 2313 of the lower housing 230 may be formed to protrude upward, compared to the bottom surface of the lower housing 230, so that a head of the fastening member can be received.

The lower housing 230 includes a rotational shaft 235 that rotatably supports the screen sensing unit 300.

The rotational shaft 235 may be disposed to protrude forward from the front wall 1651, for example.

The rotational shaft 235 is provided with, for example, a female thread portion 2351 so that a male thread portion of a fastening member 328 can be screwed. A washer 329 is coupled to the fastening member 328 before coupling the rotational shaft 235 (see FIG. 19).

The front bottom portion 2311 of the lower housing 230 is provided with a coupling rib receiving portion 2314 in which a coupling rib 218 of the upper housing 210, which will be described later, can be received. The coupling rib receiving portion 2314 may be provided in plurality disposed to be spaced apart in a longitudinal direction.

The lower housing 230 is provided with a separation suppressing portion 16532 that suppresses the frame 261 from being separated upward.

The front wall 1651 of the lower housing 230 is provided with a cut portion 16511 in which a protrusion 325 of the screen sensing unit 300 can be received.

The cut portion 16511 may be open downward.

A through hole 16531 through which the guide pin 170 is inserted is formed through the ceiling 1653 of the mounting groove 165.

The ceiling 1653 of the mounting groove 165 is provided with coupling protrusions 16533 that are coupled to the frame 261 and the supporter 290, respectively.

The coupling protrusions 16533 may include, for example, a first coupling protrusion 165331 disposed on one side (a left side in the drawing) of the through hole 16531 along the longitudinal direction of the frame 260, and a second coupling protrusion 165332 coupled to another side (a right side in the drawing) of the through hole 16531.

Accordingly, the frame 261 and the supporter 290 can be coupled at precise positions.

The lower housing 230 includes fastening member coupling portions at which the frame 261 is coupled to the lower housing 230 through fastening members 2601.

The fastening member coupling portions for fastening the frame 261 is disposed in the rear space S2.

The fastening member coupling portions for fastening the frame 261 are formed to protrude upward from both end portions of the rear bottom portion 2312.

The end portions of the fastening member coupling portions for fastening the frame 261 are formed to more protrude upward than the ceiling 1653 of the mounting groove 165.

The lower housing 230 includes a connection cable hole 237 formed therethrough such that the connection cable 155 can be drawn out.

Figure 13:
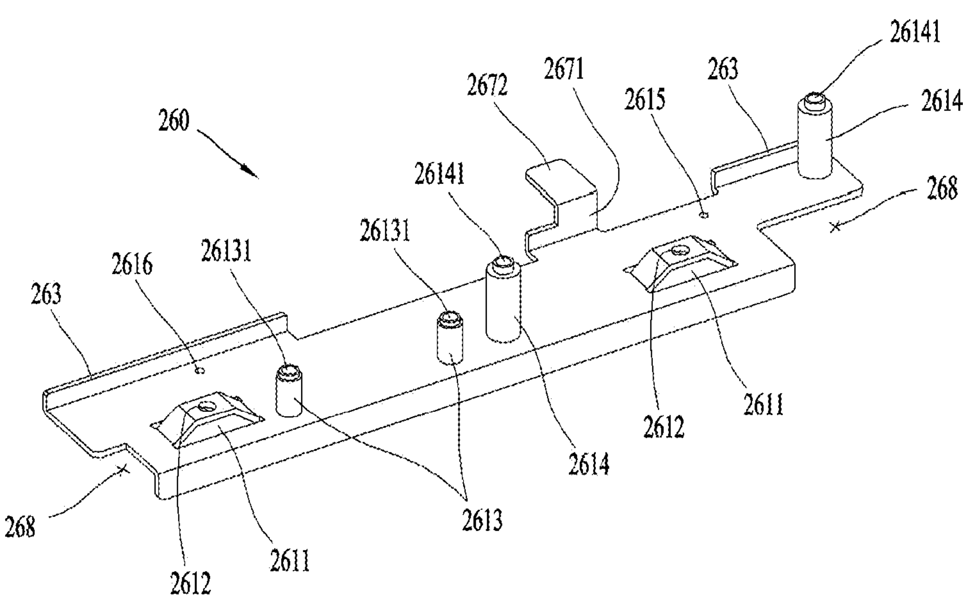
FIG. 13 is an enlarged view of the frame of FIG. 8.
Figure 14:
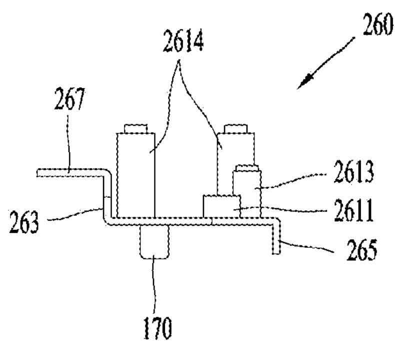
FIG. 14 is a lateral view of the frame of FIG. 13.

FIG. 13 is an enlarged view of the frame of FIG. 8, and FIG. 14 is a lateral view of the frame of FIG. 13. As illustrated in FIGS. 13 and 14, the frame 261 is formed to have a length to be accommodated inside the housing 160.

The frame 261 has a substantially rectangular plate shape.

The frame 261 includes a frame body 261 that is in contact with the ceiling 1653 of the mounting groove 165 of the lower housing 230.

The frame 260 includes protrusions 2611 that protrude upward to correspond to upper end portions of the fastening member coupling portions of the lower housing 230. Fastening member insertion holes 2612 into which the fastening members 2601 may be inserted may be formed through the protrusions 2611, respectively.

First bosses 2613 to which the screen sensing unit actuation part 350 can be coupled are formed on the frame 260. Each of the first bosses 2613 is provided with a female thread 26131 to which a fastening member 3501 can be screwed.

The frame 260 includes second bosses 2614 protruding upward therefrom such that the printed circuit board 280 and the supporter 290 can be coupled to the frame 260.

Each of the second bosses 2614 is provided with a female thread 26141 to which a fastening member 2801 can be screwed.

The second bosses 2614 more extend upward than the first bosses 2613.

Accordingly, the printed circuit board 280 can be disposed above the screen sensing unit actuating part 350.

The frame 260 is provided with front bent portions 263 that are bent upward.

The front bent portions 263 may be disposed on both end regions along the longitudinal direction of the frame 260.

The front bent portions 263 of the frame 260 are suppressed from being separated upward by the separation suppressing portions 16532 of the lower housing 230.

The frame 260 is provided with a rear bent portion 265 that is bent downward.

This can suppress deformation of the frame 260.

The frame 260 is provided with a support piece 267 that supports the supporter 290.

The support piece 267 is provided between the front bent portions 263 along the longitudinal direction.

The support piece 267 includes, for example, a vertical section 2671 extending upward from the frame body 261 and a horizontal section 2672 bent from an end portion of the vertical section 2671 and disposed horizontally.

Cut portions 268 that are formed at rear corners of both end portions of the frame body 261, respectively.

The frame body 261 includes a first coupling protrusion hole 2615 and a second coupling protrusion hole 2616 in which the first coupling protrusion 165331 and the second coupling protrusion 165332 of the lower housing 230 can be accommodated, respectively.

Figure 15:
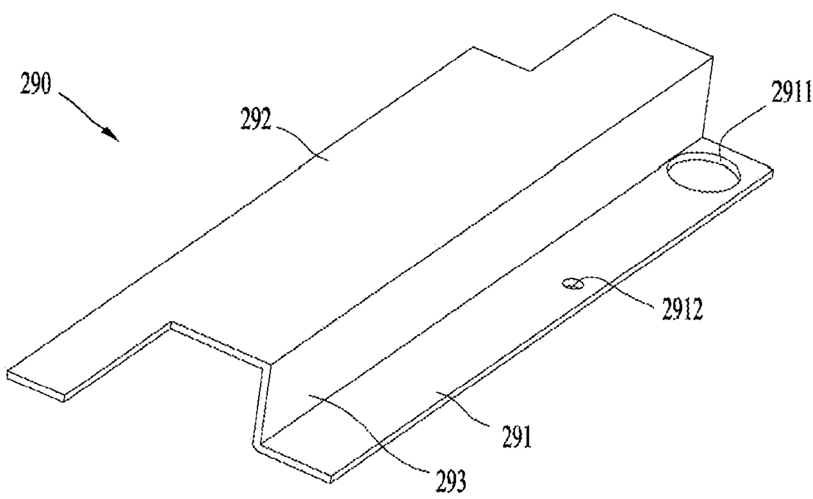
FIG. 15 is an enlarged view of the supporter of FIG. 8.
Figure 16:
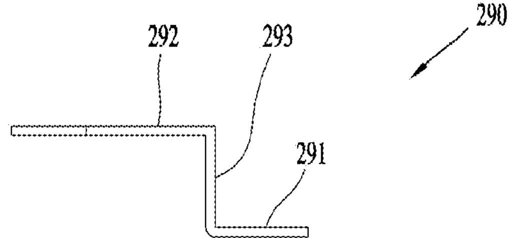
FIG. 16 is a lateral view of the supporter of FIG. 15.

FIG. 15 is an enlarged view of the supporter of FIG. 8, and FIG. 16 is a lateral view of the supporter of FIG. 15. As illustrated in FIGS. 15 and 16, the supporter 290 includes a bottom portion 291, a top portion 292, and a connection portion 293.

The bottom portion 291 is formed to be placed on the top surface of the frame body 261 of the frame 260.

The bottom portion 291 is, for example, formed in the shape of a rectangular plate with a length longer than a width.

The bottom portion 291 is provided with a through hole 2911 in which the second boss 2614 can be inserted.

The bottom portion 291 is provided with a first protrusion hole 2912 formed therethrough such that the first protrusion 165331 of the lower housing 230 can be inserted.

The connection portion 293 is formed to be bent upward at a front edge of the bottom portion 291.

The top portion 292 is formed to be bent at the upper end of the connection portion 293.

The top portion 292 and the bottom portion 291 are disposed along the horizontal direction.

The connection portion 293 is disposed almost horizontally.

Cut portions that are formed approximately in a rectangular shape are formed at corner regions of both end portions of the top portion 292.

Figure 17:
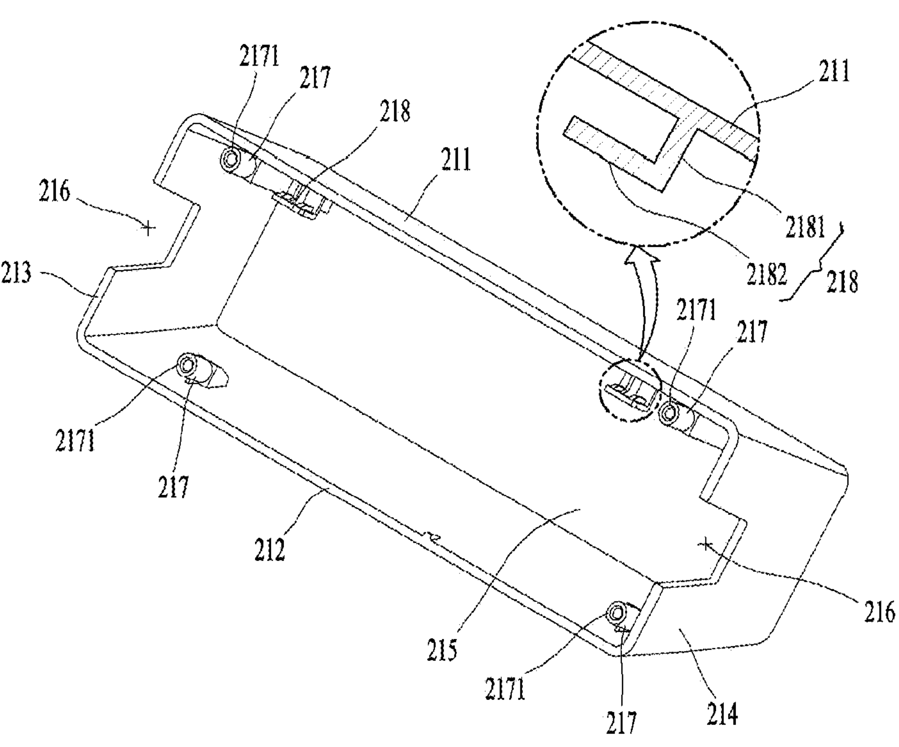
FIG. 17 is a bottom view illustrating the upper housing of the calibration device for the display of FIG. 6.

FIG. 17 is a bottom view illustrating the upper housing of the calibration device for the display of FIG. 6. As illustrated in FIG. 17, the upper housing 210 may be formed in a cylindrical shape which is open downward.

The upper housing 210 includes, for example, a front wall 211, a rear wall 212, a first end portion wall 213, a second end portion wall 214, and a top portion 215.

The front wall 211 and the rear wall 212 are, for example, formed to be upwardly inclined toward inside.

The first end portion wall 213 and the second end portion wall 214 are formed such that widths thereof gradually decrease as the walls extend upward.

A lower opening is formed through the bottom surface of the upper housing 210.

The lower housing 230 is inserted into the lower opening of the upper housing 210.

Here, the front wall 211, the rear wall 212, the first end portion wall 213, and the second end portion wall 214 of the upper housing 210 are formed to be higher in height than the front wall 1651, the rear wall 1652, the first end wall 232, and the second end wall 233 of the lower housing 230, respectively.

Accordingly, a receiving space S (front space S1, rear space S2, and upper space S3) of a preset size is defined inside the upper housing 210 and the lower housing 230.

Recesses 216 are formed by being recessed upward from the bottom of the first end portion wall 213 and the second end portion wall 214 of the upper housing 210, respectively.

The respective recesses 216 of the first end portion wall 213 and the second end portion wall 214 are formed to communicate with the mounting groove 165 of the lower housing 230.

Fastening member coupling portions 217 are formed inside the upper housing 210 to correspond to the fastening member coupling portions 2313 of the lower housing 230, respectively.

Each of the fastening member coupling portions 217 of the upper housing 210 includes a female thread 2171 to which the fastening member inserted through the fastening member coupling portion 2313 of the lower housing 230 can be screwed.

On the other hand, coupling ribs 218 are disposed on an inner surface of the front wall 211 to be coupled to the lower housing 230.

For example, the coupling rib 218 includes a protrusion 2181 protruding from the inner surface of the front wall 211, and a bent portion 2182 bent from the protrusion 2181 toward the lower opening (lower housing 230).

The bent portion 2182 is inserted into the coupling rib receiving portion 2314 of the lower housing 230.

The coupling rib 218 may be configured to be inserted into the coupling rib receiving portion 2314 before the fastening member coupling portion 217 of the upper housing 210 is in contact with the fastening member coupling portion 2313 of the lower housing 230.

Accordingly, the fastening member coupling portion 217 of the upper housing 210 can be guided to a position corresponding to the fastening member coupling portion 2313 of the lower housing 230.

This can facilitate the fastening member coupling portion 2313 of the lower housing 230 and the fastening member coupling portion 217 of the upper housing 210 to communicate with each other, such that the lower housing 230 and the upper housing 210 can be smoothly coupled to each other through the fastening member.

Figure 18:
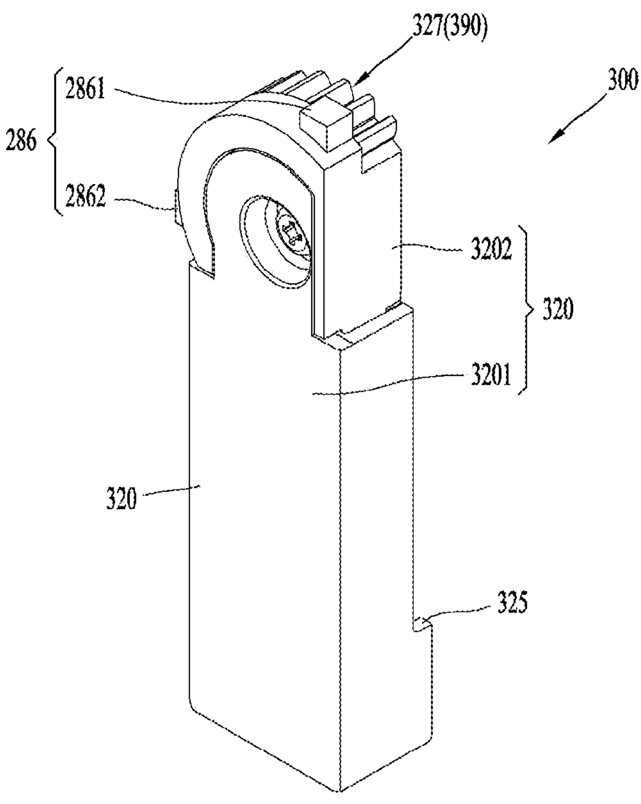
FIG. 18 is an exploded perspective view illustrating the screen sensing unit of FIG. 6.
Figure 19:
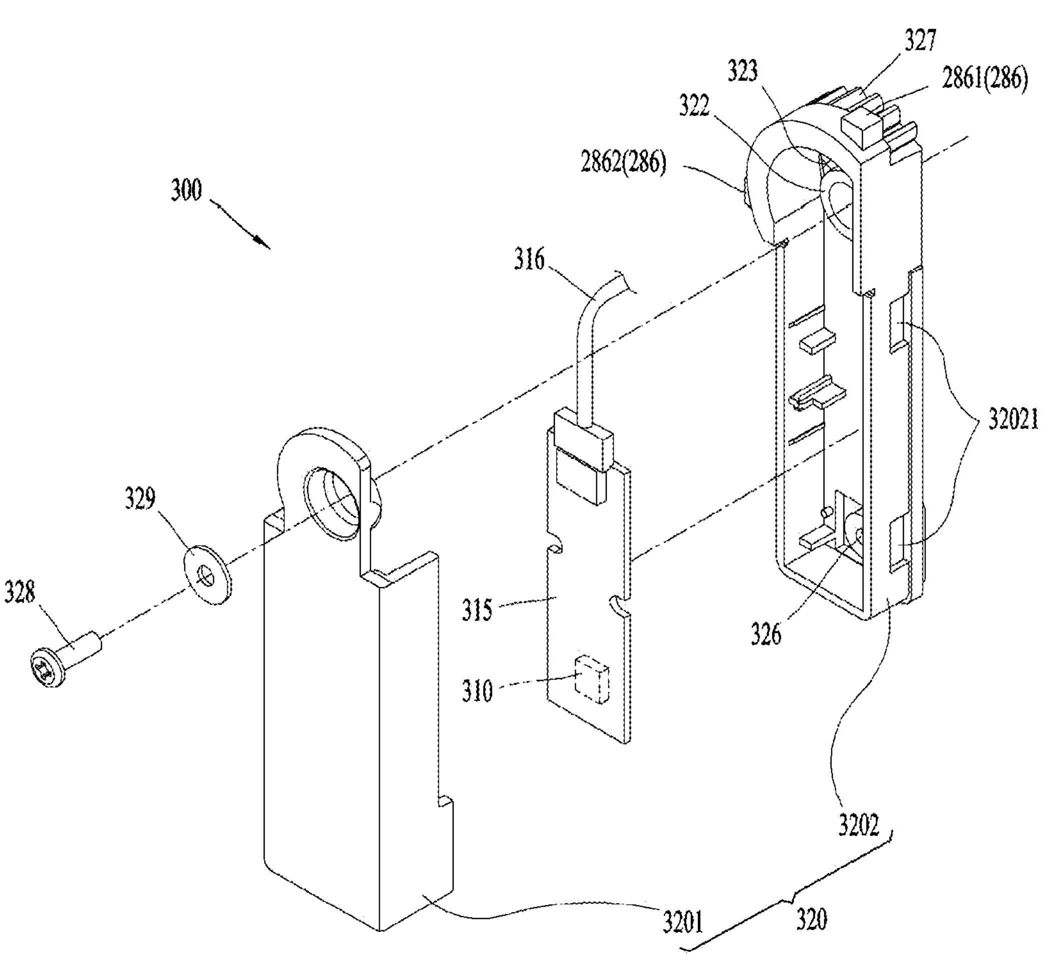
FIG. 19 is an exploded perspective view of the screen sensing unit of FIG. 18.
Figure 20:
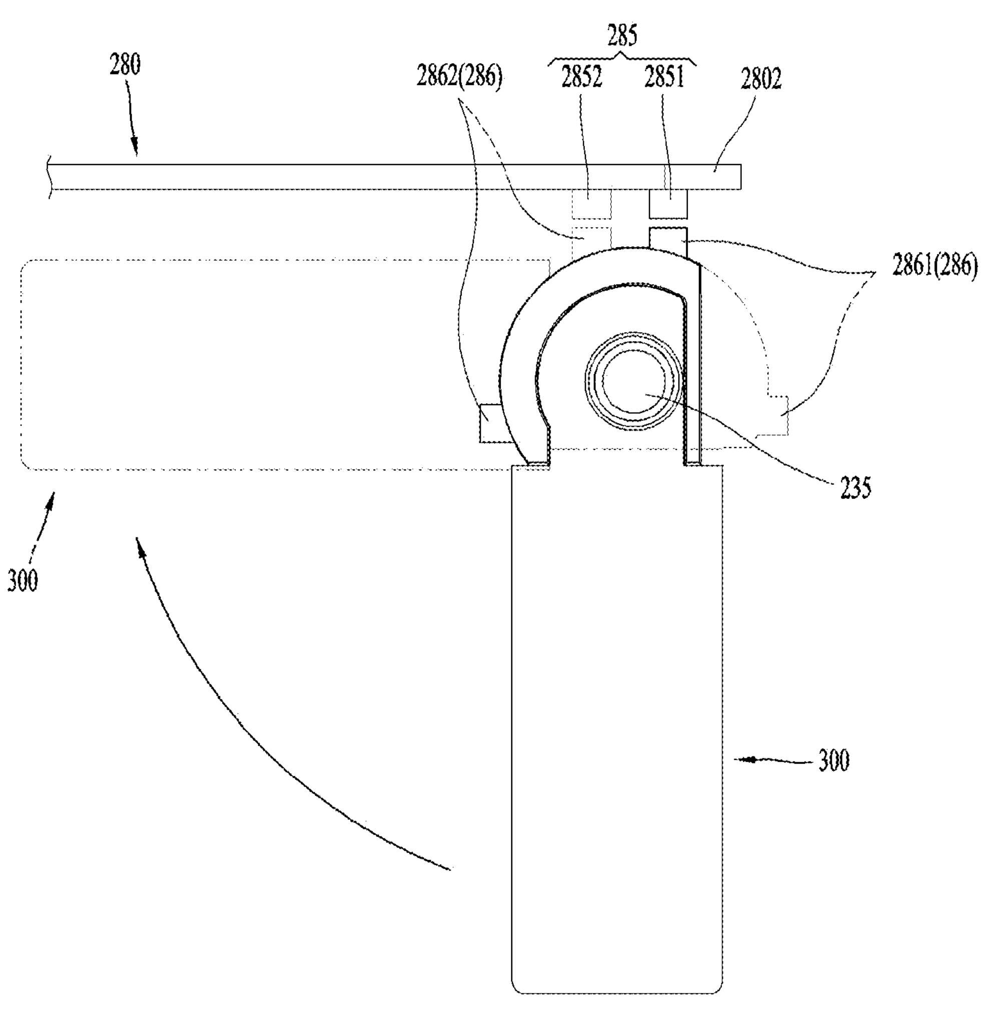
FIG. 20 is a front view of a screen sensing unit region of FIG. 6.

FIG. 18 is an exploded perspective view illustrating the screen sensing unit of FIG. 6, FIG. 19 is an exploded perspective view of the screen sensing unit of FIG. 18, and FIG. 20 is a front view of a screen sensing unit region of FIG. 6. As illustrated in FIGS. 18 to 20, the screen sensing unit 300 includes a sensor 310 and a sensor holder 320.

The sensor 310 is configured to detect (sense, photograph) the screen 121 of the display 120.

The sensor 310 may be configured as an image sensor, for example.

The sensor 310 is disposed on a sensor PCB 315.

The sensor PCB 315 is formed approximately in a rectangular plate shape.

A cable 316 having one end connected to the printed circuit board 280 is disposed on one end portion (upper end portion in the drawing) of the sensor PCB 315.

As a result, the sensor 310 and a controller 450 of the printed circuit board 280 are communicatively connected to each other.

The sensor holder 320 accommodates the sensor 310 therein, and one end portion of the sensor holder 320 is rotatably coupled to the housing 160.

The sensor holder 320 includes, for example, a front cover 3201 and a rear cover 3202 that are coupled to each other along an axial direction (a front-rear direction).

Although not specifically illustrated in the drawings, a protrusion is formed inside the front cover 3201, and a protrusion groove 32021 with which the protrusion is engaged is formed in the rear cover 3202. The protrusion groove 32021 may be provided in plurality in both side surfaces of the rear cover 3202.

Accordingly, when the front cover 3201 and the rear cover 3202 are coupled to each other, the front cover 3201 and the rear cover 3202 can be maintained stably in the coupled state without being separated unexpectedly.

A rotational shaft receiving portion 322 is formed through one end portion (upper end portion in the drawing) of the sensor holder 320, such that the rotational shaft 235 disposed on the housing 160 can be received.

The fastening member 328 may be coupled to an end portion of the rotational shaft 235 inside the rotating shaft receiving portion 322 with a washer 329 interposed therebetween.

Accordingly, the sensor holder 320 can rotate around the rotational shaft 235 without being separated from the rotational shaft 235.

A draw-out hole 323 is formed adjacent to the rotational shaft receiving portion 322 of the rear cover 3202 of the sensor holder 320, such that the cable 316 of the sensor PCB 315 can be drawn out therethrough.

The cable 316 drawn out through the draw-out hole 323 is communicatively connected to the printed circuit board 280.

A protrusion 325 protrudes from another end portion (a lower end portion in the drawing) of the sensor holder 320 toward the screen 121 of the display 120.

A through hole 326 is formed through the protrusion 325 to define a path for light irradiated from the screen 121 of the display 120.

Accordingly, light generated (irradiated) from the screen 121 of the display 120 can move into the sensor holder 320 through the through hole 326 so as to be captured (imaged) by the sensor 310.

Meanwhile, the sensor holder 320 includes a second gear portion 327 constituting a power transmission part 390 to receive driving force from the screen sensing unit actuating part 350.

For example, the second gear portion 327 may be implemented, for example, in an arcuate shape on an upper end of the sensor holder 320 (the rear cover 3202 in the embodiment of the present disclosure).

The second gear portion 327 is engaged with a first gear portion 3605, which will be described later, to rotate when the first gear portion 3605 moves linearly.

Accordingly, the sensor holder 320 can rotate between a protruding position and a retracted position.

Meanwhile, referring to FIGS. 6 and 20, a location sensing part 285 may be disposed on the printed circuit board 280 to sense the position of the screen sensing unit 300.

The position sensing part 285 includes, for example, a protruding position sensing portion 2851 that senses the protruding position of the screen sensing unit 300 and a retracted position sensing portion 2852 that senses the retracted position of the screen sensing unit 300.

The position sensing part 285 (the protruding position sensing portion 2851 and the retracted position sensing portion 2852) may be configured to include, for example, a light emitting portion that irradiates light, a reflecting portion 286 that reflects light irradiated from the light emitting portion, and a light receiving portion that receives light reflected from the reflecting portion 286.

The light emitting portion and the light receiving portion may be disposed, for example, on the printed circuit board 280.

In the embodiment of the present disclosure, each of the retracted position sensing portion 2852 and the protruding position sensing portion 2851 may include the light emitting portion and the light receiving portion.

The light emitting portion and the light receiving portion may be implemented as one body.

The embodiment of the present disclosure illustrates the case where the light emitting portion and the light receiving portion are integral with each other, but is merely illustrative, and is not limited thereto. The light emitting portion and the light receiving portion may be formed separately.

The reflecting portion 286 may be disposed on the screen sensing unit 300, for example.

In the embodiment of the present disclosure, the reflecting portion 286 is disposed on the sensor holder 320 (the rear cover 3202).

The reflecting portion 286 includes a first reflector 2861 disposed to correspond to the protruding position and a second reflector 2862 disposed to correspond to the retracted position.

The first reflector 2861 is disposed below the protruding position sensing portion 2851 when the sensor holder 320 is located at the protruding position.

The second reflector 2862 is disposed below the retracted position sensing portion 2852 when the sensor holder 320 is located at the retracted position.

According to this configuration, when the sensor holder 320 is located at the retracted position, light emitted from the retracted position sensing portion 2852 is reflected by the second reflector 2862 to be received in the retracted position sensing portion 2852.

Accordingly, the retracted position sensing portion 2852 can generate (transmit) a signal that the screen sensing unit 300 is located at the retracted position.

When the sensor holder 320 is located at the protruding position, light emitted from the protruding position sensing portion 2851 is reflected by the first reflector 2861 to be received in the protruding position sensing portion 2851.

Accordingly, the protruding position sensing portion 2851 can generate (transmit) a signal that the screen sensing unit 300 is located at the protruding position.

Figure 21:
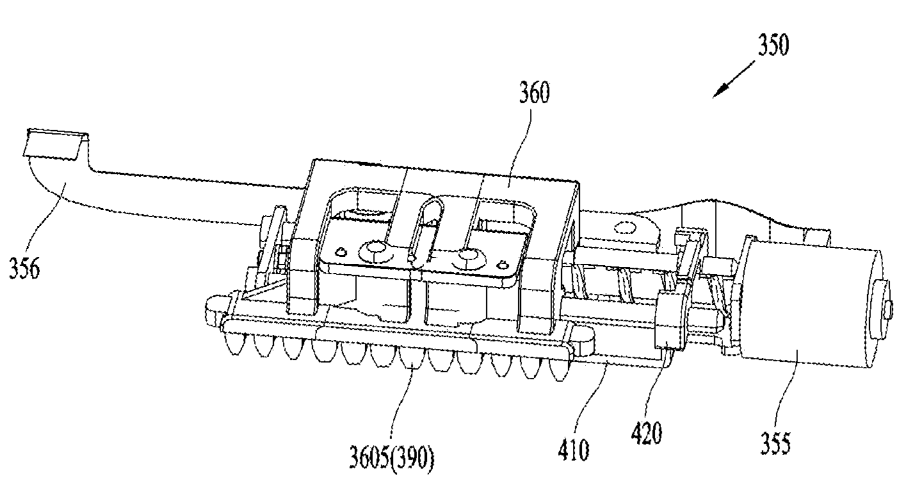
FIG. 21 is a perspective view of a screen sensing unit actuating part of FIG. 6.
Figure 22:
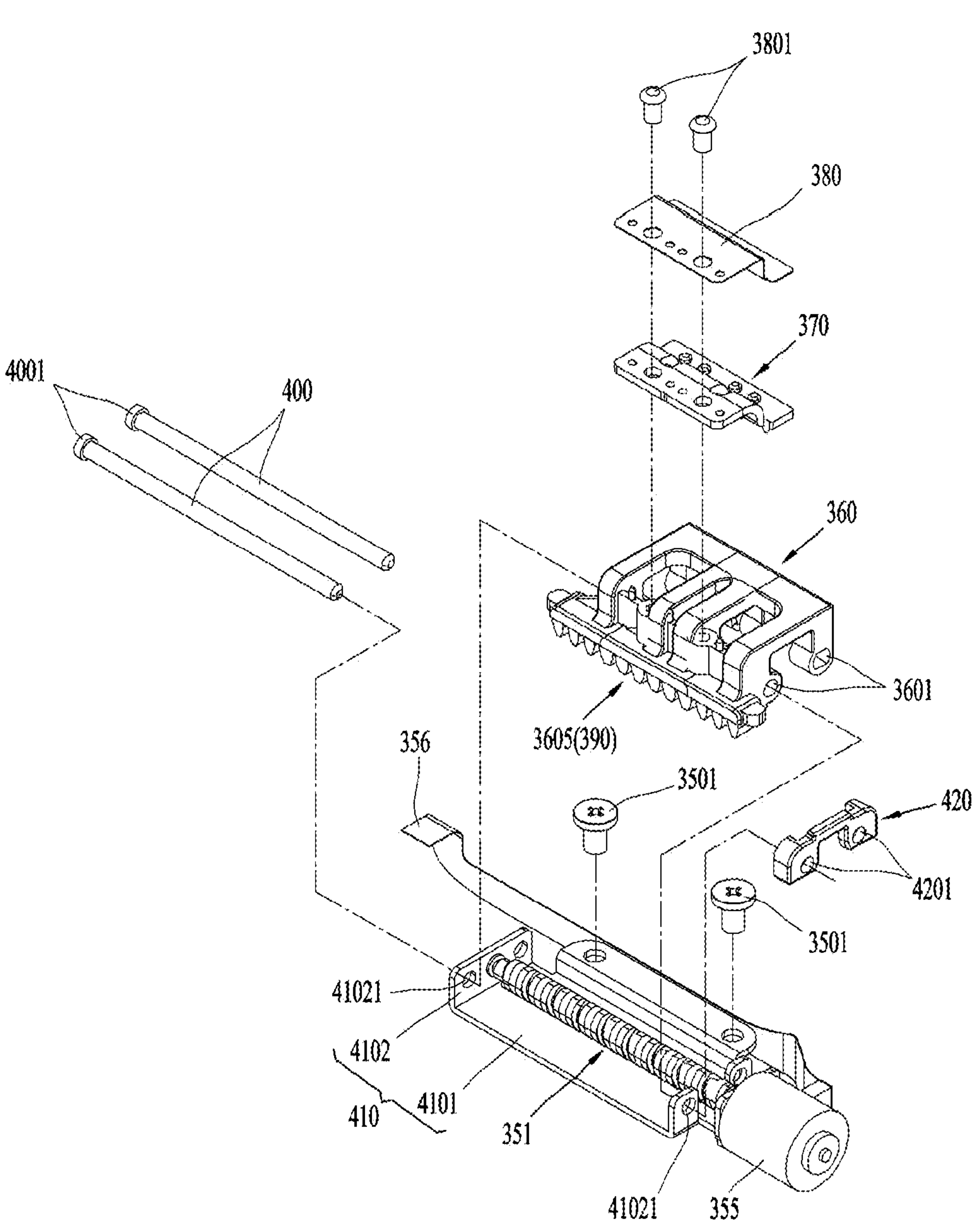
FIG. 22 is an exploded perspective view of the screen sensing unit actuating part of FIG. 21.

FIG. 21 is a perspective view of the screen sensing unit actuating part of FIG. 6, FIG. 22 is an exploded perspective view of the screen sensing unit actuating part of FIG. 21, and FIG. 23 is a lateral sectional view illustrating a coupled state between a lead screw and a spiral coupling member of FIG. 21. As illustrated in FIGS. 21 and 23, the screen sensing unit actuating part 350 includes a lead screw 351, a slider 360, and a power transmission part 390.

The lead screw 351 may be formed in a rod shape.

The lead screw 351 includes, for example, a lead screw body 3511 in a rod shape, and a spiral 3512 formed in a spiral shape on the surface of the lead screw body 3511.

In the embodiment of the present disclosure, the spiral 3512 is implemented as a spiral groove recessed into the surface of the lead screw body 3511.

The lead screw 351 is rotatably supported by a bracket 410.

The bracket 410 includes, for example, a bottom portion 4101 and bent supporting portions 4102 bent upward at both ends of the bottom portion 4101.

The bracket 410 has a length corresponding to the length of the lead screw 351.

A lead screw drive motor 355 that rotates the lead screw 351 is disposed on one side (right side in the drawing) of the bracket 410.

The lead screw drive motor 355 is configured to enable forward and reverse rotation, for example.

The lead screw drive motor 355 is controllably connected to the printed circuit board 280 by a cable 356.

A coupling portion 4103 is disposed on one side (rear side in the drawing) of the bracket 410 so that the bracket 410 can be coupled to the frame 260.

The coupling portion 4103 includes a vertical section 41031 bent upward from a rear edge of the bottom portion 4101 of the bracket 410, and a horizontal section 41032 bent backward from the vertical section 41031.

Fastening member insertion holes 41033 into which fastening members 3501 can be inserted are formed through the horizontal section 41032.

The bracket 410 is provided with guides 400 disposed in parallel to the lead screw 351.

The guides 400 are disposed on both sides of the lead screw 351, respectively.

The bracket 410 (the bent support portions 4102) includes guide holes 41021 into which the guides 400 can be inserted.

A head 4001 may be formed on one end portion (left end portion in the drawing) of each guide 400.

A fixing member 420 for fixing the guides 400 is disposed on one side (right side in the drawing) of the bracket 410.

Guide insertion holes 4201 into which the guides 400 can be inserted are formed through the fixing member 420.

The fixing member 420, for example, may be press-fitted to the guides 400.

The fixing member 420 may be coupled, for example, to the bent support portion 4102 of the bracket 410 adjacent to the lead screw drive motor 355.

The slider 360 have a substantially rectangular parallelepiped shape.

The slider 360 includes guide receiving holes 3601 into which the guides 400 are inserted to be relatively movable.

The slider 360 is provided with a spiral coupling member 370 coupled to the spiral 3512 of the lead screw 351.

The spiral coupling member 370 includes, for example, a body 3701 formed in the shape of a plate, and a protrusion 3702 that protrudes from the body 3701 to be inserted into the spiral 3512.

The protrusion 3702 may protrude downward from the bottom surface of the body 3701.

The protrusion 3702 may be provided in plurality spaced apart from one another in the longitudinal direction of the lead screw 351.

The slider 360 includes an elastic pressing member 380 for elastically pressing the spiral coupling member 370 such that the spiral coupling member 370 is brought into close contact with the lead screw 351.

This can stably maintain the coupled state between the spiral coupling member 370 and the lead screw 351.

The elastic pressing member 380 may be configured as a leaf spring, for example.

Fastening member insertion holes 3703 and 3803 may be formed through the spiral coupling member 370 and the elastic pressing member 380, such that fastening members 3801 can be inserted.

The fastening member insertion holes 3703 and 3803 of the spiral coupling member 370 and the elastic pressing member 380 are formed to communicate with each other.

The slider 360 includes female thread portions 3603 to which the fastening members 3801 that sequentially pass through the elastic pressing member 380 and the spiral coupling member 370 can be screwed.

Meanwhile, the screen sensing unit actuating part 350 includes a power transmission part 390 that transmits driving force of the slider 360 to the screen sensing unit 300.

The power transmission part 390 includes a first gear portion 3605 formed in a mutual contact region between the slider 360 and the screen sensing unit 300, and a second gear portion 327 engaged with the first gear portion 3605.

The first gear portion 3605 may be implemented in a linear shape (rack-teeth shape), for example.

The second gear portion 327 may be implemented, for example, in a circular (pinion) or arcuate (sector gear) shape.

In the embodiment of the present disclosure, the first gear portion 3605 is formed in a linear shape and the second gear portion 327 is formed in an arcuate shape.

The first gear portion 3605 has teeth formed along the longitudinal direction on the bottom of the slider 360.

The second gear portion 327 is formed in the arcuate shape on the sensor holder 320 of the screen sensing unit 300.

With this configuration, the lead screw 351 and the lead screw drive motor 355 can be coupled to the bracket 410, and the slider 360 can be disposed above the lead screw 351.

The guide 400 may sequentially pass through the bent support portion (the left bent support portion in the drawing) of the bracket 410, the slider 360, and the bent support portion 4102 (the right bent support portion in the drawing) of the bracket 410 so as to be fixed by the fixing member 420.

After the spiral coupling member 370 is coupled to the spiral 3512 of the lead screw 351 and the elastic pressing member 380 is disposed above the spiral coupling member 370, the fastening members 3801 may sequentially pass through the elastic pressing member 380 and the spiral coupling member 370 so as to be screwed to the slider 360.

Figure 24:
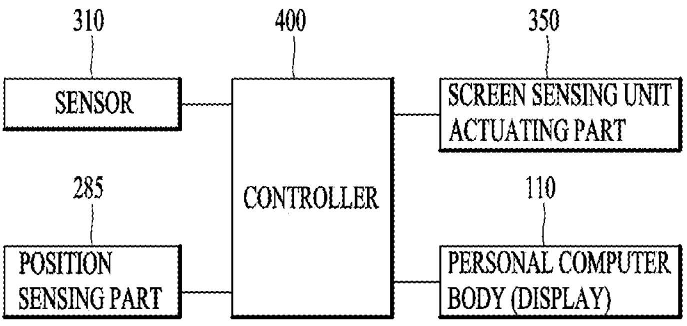
FIG. 24 is a control block diagram illustrating the calibration device for the display of FIG. 1.
Figure 25:
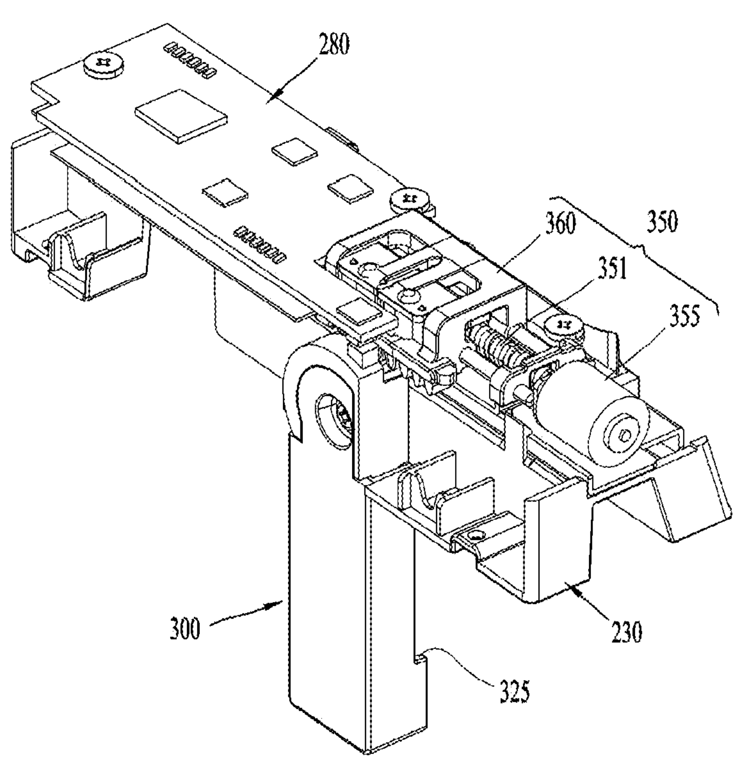
FIG. 25 is a diagram illustrating a protruding position of the screen sensing unit of FIG. 6.
Figure 26:
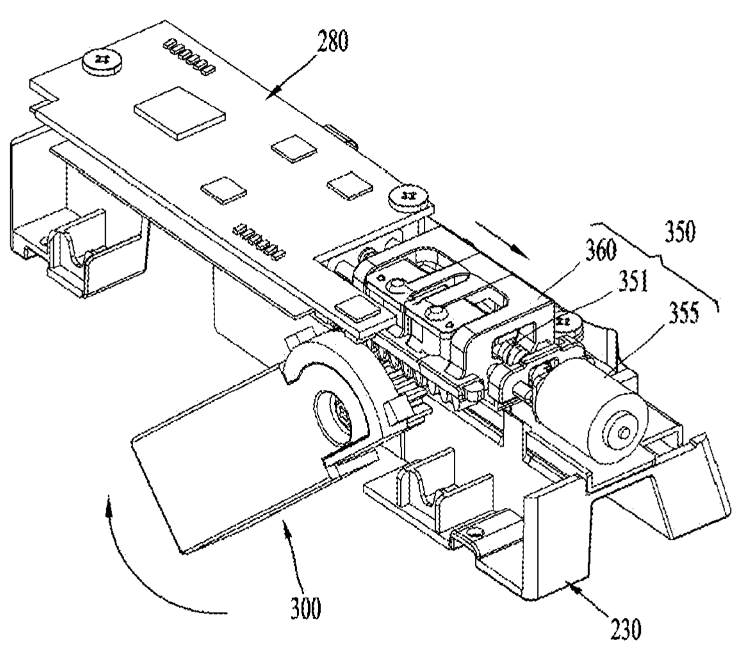
FIG. 26 is a diagram for explaining the movement of the screen sensing unit of FIG. 24.
Figure 27:
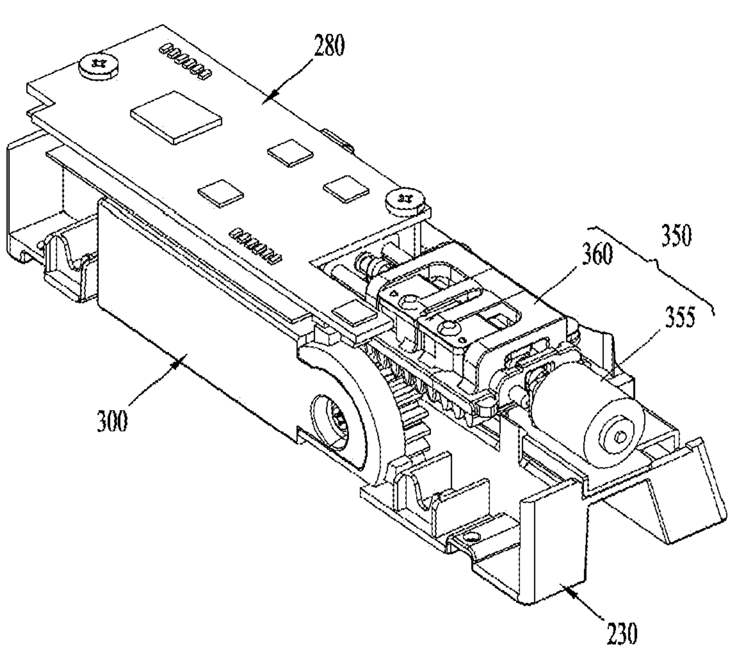
FIG. 27 is a diagram illustrating a retracted position of the screen sensing unit of FIG. 26.

FIG. 24 is a control block diagram illustrating the calibration device for the display of FIG. 1, FIG. 25 is a diagram illustrating the protruding position of the screen sensing unit of FIG. 6, FIG. 26 is a diagram for explaining the movement of the screen sensing unit of FIG. 24, and FIG. 27 is a diagram illustrating the retracted position of the screen sensing unit of FIG. 26. As illustrated in FIG. 24, the display calibration device 150 includes a controller 450 having a control program and implemented in the form of a microprocessor.

The controller 450 may be disposed on the printed circuit board 280, for example.

The sensor 310 of the screen sensing unit 300 is communicatively connected to the controller 450.

The screen sensing unit actuating part 350 (the lead screw drive motor 355) is controllably connected to the controller 450.

The controller 450 is communicatively connected to the display 120 through the connection cable 155 connected to the printed circuit board 280. In the embodiment of the present disclosure, for convenient description of the drawings, the case where the connection cable 155 is connected to the personal computer body 110 and then connected to the display 120 through the personal computer body 110 is illustrated.

The position sensing part 285 for sensing the position of the screen sensing unit 300 is communicatively connected to the controller 450.

The controller 450 may be configured to control the screen sensing unit actuating part 350 based on a sensing signal of the position sensing part 285.

With this configuration, the screen sensing unit 300 is coupled to the rotational shaft 235 of the lower housing 230. The frame 260 may be coupled to the ceiling 1653 of the mounting groove 165 of the lower housing 230, and the supporter 290 and the printed circuit board 280 may be coupled to the upper surface of the frame 260.

The screen sensing unit actuating part 350 is coupled to one side on top of the frame 260.

The cable of the screen sensing unit actuating part 350 is connected to the printed circuit board 280.

When the printed circuit board 280 and the screen sensing unit actuating part 350 are completely coupled to the lower housing 230, the upper housing 210 is coupled from the top of the lower housing 230.

When the lower housing 230 is inserted into the upper housing 210, the coupling rib of the upper housing 210 is received in the coupling rib receiving portion of the lower housing 230.

As a result, each fastening member coupling portion of the upper housing 210 is disposed to correspond to the fastening member coupling portion of the lower housing 230.

Each fastening member is inserted from the bottom of the lower housing 230 to be screwed into the fastening member of the upper housing 210.

Meanwhile, when the display calibration device 150 is to be mounted on the edge 125 of the display 120, the display calibration device 150 moves downward in a state where the guide pin 170 of the mounting groove 165 of the display calibration device 150 is disposed above the guide pin receiving portion 1251 of the display 120, such that the edge 125 of the display 120 is inserted into the mounting groove 165.

When the guide pin 170 is inserted into the guide pin receiving portion 1251 of the display 120, the frame 260 inside the housing 160 is attracted by the permanent magnets 1252 of the display 120. This can suppress a generation of clearance (gap) of the display calibration device 150.

When the connection cable 155 of the display calibration device 150 is connected to the connection port of the personal computer, the display calibration device 150 and the personal computer can communicate with each other.

FIG. 24 is a diagram illustrating a protruding position of the screen sensing unit of FIG. 6, FIG. 25 is a diagram for explaining the movement of the screen sensing unit of FIG. 24, and FIG. 26 is a diagram illustrating a retracted position of the screen sensing unit of FIG. 25. As illustrated in FIG. 26, the display calibration device 150 is set, as an initial state, to a retracted position where the screen sensing unit 300 is retracted inside the housing 160.

When desiring to perform color correction and/or image correction of the screen 121 of the display 120, a correction mode is executed on the display 120 or the personal computer body 110 in the state where the display calibration device 150 is communicatively connected to the display 120 or the personal computer body 110.

Meanwhile, when a start signal of the correction mode is input from the display 120 or the personal computer body 110, the controller 450 may confirm the position of the screen sensing unit 300 through the position sensing part 285.

When the position sensing part 285 senses that the screen sensing unit 300 is located at the retracted position, the controller 450 controls the lead screw drive motor 355 such that the screen sensing unit 300 can move to the retracted position.

The lead screw rotates in a direction in which the slider 360 moves away from the lead screw drive motor 355, so that the screen sensing unit 300 rotates to the protruding position, as illustrated in FIG. 25.

When the screen sensing unit 300 rotates to the protruding position, a test screen may be output on the screen 121 of the display 120.

At this time, the sensor 310 of the screen sensing unit 300 may capture the test screen, and the sensor PCB 315 may transmit the image captured by the sensor 310 to the controller 450 of the printed circuit board 280.

The controller 450 extracts data necessary for image correction from the image captured by the sensor 310 and transmits the extracted data to the display 120 or the personal computer body 110.

The display 120 or the personal computer body 110 performs color correction and/or image correction of the display 120 based on the data transmitted from the controller 450.

Meanwhile, the controller 450 controls the rotation of the lead screw drive motor 355 so that the screen sensing unit 300 can move to the retracted position when the color correction and/or image correction are completed.

As illustrated in FIG. 26, when the lead screw rotates in a direction in which the slider 360 moves toward the lead screw drive motor 355, the screen sensing unit 300 rotates around the rotational shaft 235 in a clockwise direction in the drawing.

The controller 450 senses the position of the screen detection unit 300 through the position sensing part 285. When the screen sensing unit 300 is located at the retracted position at which it is received inside the housing 160, as illustrated in FIG. 27, the controller 450 stops the operation of the lead screw drive motor 355.

The foregoing description has been given of specific embodiments of the present disclosure. However, the present disclosure may be embodied in various forms without departing from the idea or essential characteristics thereof, and thus the above-described embodiments should not be limited by the details of the detailed description.

In addition, even embodiments not listed in the detailed description should be interpreted within the scope of the technical idea defined in the appended claims. It is intended that the present disclosure cover the modifications and variations of this invention provided they come within the scope of the appended claims and their equivalents.

The invention claimed is:

1. A calibration device for a display, the calibration device comprising:

a housing that has a mounting groove by which the housing is mounted on an edge of the display, the housing being detachably mounted on the edge of the display;

a screen sensing unit that is disposed in the housing to be movable between a protruding position protruding to the front of a screen of the display and a retracted position retracted to outside of the screen of the display; and a screen sensing unit actuating part that actuates the screen sensing unit so that the screen sensing unit is located at the protruding position or the retracted position, wherein the housing comprises a guide pin that is inserted into the edge of the display.

2. The calibration device of claim 1, wherein the screen sensing unit comprises:

a sensor that senses the screen of the display; and a sensor holder that receives the sensor therein, and has one end portion rotatably coupled to the housing.

3. The calibration device of claim 2, further comprising a printed circuit board that is disposed inside the housing, and electrically connected to the sensor and the screen sensing unit actuating part.

4. The calibration device of claim 3, wherein the housing comprises:

a lower housing in which the mounting groove is formed; and an upper housing that is coupled to a top of the lower housing to form an inner receiving space together with the lower housing.

5. The calibration device of claim 4, wherein the inner receiving space of the housing comprises:

a front space defined at the front of the mounting groove;

a rear space defined at the rear of the mounting groove; and an upper space defined above the mounting groove, and the printed circuit board is disposed in the upper space.

6. The calibration device of claim 5, wherein the screen sensing unit actuating part comprises:

a lead screw that is disposed in a longitudinal direction of the edge of the display;

a slider that is coupled to the lead screw to be relatively movable; and a power transmission part that transmits moving force of the slider to the screen sensing unit.

7. The calibration device of claim 6, wherein the power transmission part comprises:

a first gear portion that is formed in a mutual contact area between the slider and the screen sensing unit; and a second gear portion that is engaged with the first gear portion.

8. The calibration device of claim 7, wherein the first gear portion is formed in a linear shape and the second gear portion is formed in a circular or arcuate shape.

9. The calibration device of claim 6, wherein the lead screw comprises:

a lead screw body that is formed in a rod shape; and a spiral that is formed in a spiral shape on an outer surface of the lead screw body, the slider is provided with a spiral coupling member that is coupled to the spiral.

10. The calibration device of claim 9, wherein the spiral is formed as a spiral groove recessed into the outer surface of the lead screw body, and the spiral coupling member comprises:

a body that is formed in a shape of a plate; and a protrusion that protrudes from the body to be inserted into the spiral groove.

11. The calibration device of claim 10, wherein the spiral coupling member further comprises an elastic pressing member that is detachable from the slider, and disposed to elastically press the spiral coupling member, such that the spiral coupling member is brought into close contact with the lead screw.

12. The calibration device of claim 11, further comprising a fastening member that is fastened to the slider through the spiral coupling member and the elastic pressing member.

13. The calibration device of claim 6, wherein the printed circuit board is provided with an overlap portion that overlaps the slider along an axial direction.

14. The calibration device of claim 13, wherein the overlap portion comprises a position sensing part that senses a position of the screen sensing unit.

15. The calibration device of claim 6, further comprising a guide disposed in parallel with the lead screw, wherein the slider comprises a guide receiving portion in which the guide is received to be relatively movable.

16. The calibration device of claim 3, wherein a frame made of a magnetic material is disposed inside the housing, the guide pin protrudes downward from a bottom of the frame and protrudes downward into the mounting groove.

17. The calibration device of claim 16, further comprising a supporter that is disposed between the frame and the printed circuit board to support the printed circuit board below the printed circuit board.

18. The calibration device of claim 3, further comprising a connection cable that has one end portion communicatively connected to the printed circuit board and another end portion drawn out of the housing to be connected to the display or a personal computer body connected to the display.

19. A personal computer having a calibration device for a display, the personal computer comprising;

a display;

a personal computer body that is connected to the display; and a calibration device for a display that is detachably mounted on an edge of the display to sense and calibrate a screen of the display, wherein the calibration device for the display comprises:

a housing that has a mounting groove by which the housing is mounted on an edge of the display, the housing being detachably mounted on the edge of the display;

a screen sensing unit that is disposed in the housing to be movable between a protruding position protruding to the front of a screen of the display and a retracted position retracted to outside of the screen of the display; and a screen sensing unit actuating part that actuates the screen sensing unit so that the screen sensing unit is located at the protruding position or the retracted position, the calibration device for the display is communicatively connected to the display or the personal computer body, wherein the housing comprises a guide pin that is inserted into the edge of the display.

* * * * *